(12) United States Patent
Hirata et al.

(10) Patent No.: US 6,329,946 B1
(45) Date of Patent: Dec. 11, 2001

(54) GPS POSITION MEASURING SYSTEM AND GPS POSITION MEASURING APPARATUS

(75) Inventors: Seiichiro Hirata, Tokyo (JP); Sergy V. Lyusin, Santa Clara, CA (US)

(73) Assignees: Mitsubishi Denki Kabushiki Kaisha, Tokyo (JP); Magellan Corporation, Santa Clara, CA (US); Magellan Systems Japan Inc., Osaka (JP)

( * ) Notice: Subject to any disclaimer, the term of this patent is extended or adjusted under 35 U.S.C. 154(b) by 0 days.

(21) Appl. No.: 09/584,154

(22) Filed: May 31, 2000

(51) Int. Cl.$^7$ .............................. G01S 5/14; H04L 27/30
(52) U.S. Cl. ........................................ 342/357.12; 375/150
(58) Field of Search ........................ 342/357.06, 357.12, 342/357.05; 375/150

(56) References Cited

U.S. PATENT DOCUMENTS

| | | |
|---|---|---|
| 5,663,734 | 9/1997 | Krasner . |
| 5,874,914 | 2/1999 | Krasner . |
| 5,987,059 * | 11/1999 | Harrison et al. ..................... 375/150 |
| 6,002,363 | 12/1999 | Krasner . |
| 6,044,105 * | 3/2000 | Gronemeyer ........................ 375/152 |

FOREIGN PATENT DOCUMENTS

| | | |
|---|---|---|
| A-530024 | 2/1993 | (JP) . |
| A-11513787 | 11/1999 | (JP) . |
| A-11513788 | 11/1999 | (JP) . |

OTHER PUBLICATIONS

Tracktag Autonomous Tidget Geolocation System.
Goiser, Alois M. J. et al, "Synchronizing a Digital GPS Receiver", MELECON9'96, May 1996, pp. 1043–1046, vol. 2.*

* cited by examiner

Primary Examiner—Gregory C. Issing

(57) ABSTRACT

A Global Positioning System carries out Doppler correction of a C/A code sequence after a frequency conversion, and calculates a pseudo range by performing correlation calculation between the C/A code, which is obtained by summing up the C/A code sequence beginning from a polarity inversion boundary determined at a correlation peak detecting step ST10, and a C/A code generated in a GPS terminal. When a received electric field detected by a received electric field intensity detector 11 is good, the current position is determined from the pseudo range and the navigation data extracted by the GPS terminal itself, whereas when the received electric field is poor, the current position is determined from the pseudo range and the navigation data sent from an external apparatus.

24 Claims, 23 Drawing Sheets

FIG.3

| DETECTED TEMPERATURE (°C) | FREQUENCY DRIFT (HZ) |
|:---:|:---:|
| 0 | 40 |
| 5 | 36 |
| 10 | 33 |
| ⋮ | ⋮ |

GPS POSITION MEASURING SYSTEM AND GPS POSITION MEASURING APPARATUS

BACKGROUND OF THE INVENTION

1. Field of the Invention

The present invention relates to a Global Positioning System and a Global Positioning apparatus for precisely determining a location by receiving GPS signals from satellites.

2. Description of Related Art

Many satellites orbit the earth, and continuously transmit radio waves at the same carrier frequency of 1575.42 GHz. The radio waves are phase modulated by pseudo-random sequences which are assigned uniquely to individual satellites as different code patterns, so that the different radio waves can be easily identified. As a typical pseudo-random sequence, is known a regularly modulated code pattern called a C/A code (clear and acquisition code) available to the public. Furthermore, the radio waves carry navigation data such as satellite orbit information, satellite correction data, correction coefficients of the ionosphere, etc. which are necessary for users to perform positioning. The navigation data are transmitted by means of polarity inversions in the C/A code sequence.

FIG. 21 is a diagram showing the C/A code sequence. The C/A code sequence is a regularly arranged code sequence consisting of PN frames, each of which includes 1023 bits of one millisecond long. The navigation data is a 50 BPS signal, and the polarity of the C/A code sequence is reversed in accordance with the polarity of the navigation data.

FIG. 22 is a block diagram showing a configuration of a conventional Global Positioning System and Global Positioning apparatus disclosed in U.S. Pat. No. 5,663,734, for example. In this figure, the reference numeral 101 designates a base station having a GPS receiving antenna 102 and a transmitting and receiving antenna 103. The reference numeral 104 designates a remote unit.

The remote unit 104 comprises an RF (radio frequency) to IF (intermediate frequency) converter 106 with a GPS receiving antenna 105; an A/D converter 107 for converting the analog signal from the converter 106 to a digital signal; a memory (digital snapshot memory) 108 for recording the output of the A/D converter 107; and a general purpose programmable digital signal processor 109 (called DSP from now on) for processing a signal fed from the memory 108.

The remote unit 104 further comprises a program EPROM 110 connected to the DSP 109, a frequency synthesizer 111, a power regulator 112, a write address circuit 113, a microprocessor 114, a RAM (memory) 115, an EEPROM 116, and a modem 118 which has a transmitting and receiving antenna 117, and is connected to the microprocessor 114.

Next, the operation of the conventional GPS will be described.

The base station 101 commands the remote unit 104 to perform measurement via a message transmitted over a data communication link 119. The base station 101 also sends within this message Doppler data, a piece of satellite information on a satellite in view. The Doppler data has a format of frequency information, and the message will specify an identity of the satellite in view. This message is received by the modem 118 in the remote unit 104, and is stored in the memory 108 connected to the microprocessor 114.

The microprocessor 114 handles data information transfer between the modem 118 and the DSP 109 and write address circuit 113, and controls the power management functions in the remote unit 104.

When the remote unit 104 receives a command (e.g., from the base station 101) for GPS processing together with the Doppler information, the microprocessor 114 activates the power regulator 112 in accordance with the command. The power regulator 112 assigns functions to the RF to IF converter 106, A/D converter 107, memory 108, DSP and frequency synthesizer 111 via power lines 120a–120e. This causes the signal from the GPS satellite which is received by the antenna 105 to be down-converted to an IF frequency, followed by conversion to digital data.

A continuous set of such data, typically corresponding to a duration of 100 milliseconds to one second (or even longer), is stored in the memory 108.

Pseudo range calculation is executed by the DSP 109 that uses a fast Fourier transform (FFT) algorithm, which permits very rapid computation of the pseudo ranges by quickly performing a large number of correlation operations between a locally generated reference and the received signals. The fast Fourier transform algorithm permits a simultaneous and parallel search of all positions, thus accelerating the required computation process.

Once the DSP 109 completes its computation of the pseudo ranges for each of the in view satellites, it transmits this information to the microprocessor 114 through an interconnect bus 122. Then, the microprocessor 114 utilizes the modem 118 to transmit the pseudo range data over the data communication link 119 to the base station 101 for final position computation.

In addition to the pseudo data, a time lag may simultaneously be transmitted to the base station 101 that indicates the elapsed time from the initial data collection in the memory 108 to the time of transmission over the data communication link 119. This time lag can improve the capability of the base station 101 to perform position calculation, because it makes it possible to determine the GPS satellite positions at the time of data collection.

The modem 118 utilizes a separate transmitting and receiving antenna 117 to transmit and receive messages over the data communication link 119. The modem 118 includes a communication receiver and a communication transmitter, which can be alternately connected to the transmitting and receiving antenna 117. Similarly, the base station 101 may use a separate antenna 103 to transmit and receive data link messages, thus enabling the base station 101 to continuously receive GPS signals via the GPS receiving antenna 102.

It is expected that the position calculations in the DSP 109 will take less than a few seconds, depending upon the amount of the data stored in the memory 108 and the 30 speed of the DSP 109 or several DSPs.

As described above, the memory 108 captures a record corresponding to a relatively long period of time. The efficient processing of this large block of data using fast convolution method contributes to improve ability of processing signals with low received levels due to partial blockage from buildings, trees etc.

All pseudo ranges for visible GPS satellites are computed using the same buffered data. This will improve performance of a continuous tracking GPS receiver in such situations as urban blockage conditions in which the signal amplitudes are rapidly changing.

The signal processing carried out by the DSP 109 will now be described with reference to FIG. 23. The objective of the processing is to determine the timing of the received waveform with respect to a locally generated waveform. Furthermore, in order to achieve high sensitivity, a very long portion of such a waveform, typically 100 milliseconds one second, is processed.

The received GPS signal (C/A code sequence) consists of repetitive pseudo random pattern (PN frame) of 1023 bits of one millisecond long, and successive PN frames are added to one another. For example, there are 1000 PN frames over a period of one second. The first such frame is coherently added to the next frame, and the result added to the third frame, followed by the additions as shown in FIGS. 23(A) –23(E). The result is a signal having a duration of one PN frame (=1023 chips). The phase of this sequence is compared to a local reference sequence to determine the relative timing between the two, that is, the pseudo range.

With the foregoing configuration, the conventional Global Positioning System carries out preprocessing operation which precedes the correlation calculations, and which is called "preliminary integration of the received GPS signal" to implement high sensitivity. In this process, the preliminary integration is carried out for 5–10 PN frames to avoid reduction in the integrals due to polarity inversions in the navigation data.

The C/A code sequence in the GPS received signal can change its phases, that is, have polarity inversions at the transitions of the bits of the navigation data. Therefore, the signal components may cancel out each other in the integration (cumulative summing) process because of the polarity inversions of the C/A code sequence in accordance with the navigation data, hindering sufficient improvement in the sensitivity (S/N ratio).

In other words, the conventional system does not detect the polarity inversions in the navigation data.

This limits the theoretical number of data to be integrated, and hence presents a problem of providing only insufficient improvement in the sensitivity (S/N ratio).

In addition, every time it determines its position (called "positioning" from now on), the remote unit functioning as a terminal collects Doppler information from the base station, calculates pseudo ranges to the visible satellites, and determines its position from the pseudo ranges or by transmitting the results to the server. Thus, the positioning always requires communication with the server, offering a problem of entailing communication cost.

SUMMARY OF THE INVENTION

The present invention is implemented to solve the foregoing problems. It is therefore an object of the present invention to provide a highly sensitive Global Positioning System and Global Positioning apparatus that can reduce the communication cost by limiting communications with a server only to a case where the receiving sensitivity is insufficient, and that can achieve stable reception inside buildings or in the blockage therefrom.

According to one aspect of the present invention, a GPS terminal of the Global Positioning system converts a frequency of the GPS signal received; A/D converts the GPS signal passing through the frequency conversion using a sampling signal consisting of a predetermined number of pulses per unit time; stores the GPS signal after the A/D conversion for a predetermined time interval; performs Doppler correction of a carrier frequency of a selected satellite included in the stored GPS signal using local oscillation frequency deviation detection information and Doppler information which is detected by the GPS terminal or provided by the external apparatus; performs Doppler correction of a C/A code signal of the selected satellite; performs over a prescribed interval a processing in which corresponding bit values in individual C/A code long blocks of the GPS signal passing through the Doppler correction are multiplied by the navigation data which is provided by the external apparatus or detected by the GPS terminal itself to align polarity of the corresponding bit values, followed by summing up the corresponding bit values over the prescribed interval; iterates the same processing by a number of the navigation data, followed by obtaining cumulative results of the processings; carries out correlation calculation between the cumulative results and the C/A code signal of the selected satellite held in the GPS terminal; obtains a delay time to a peak position of the correlation values; and determines a pseudo range between the GPS terminal and the selected satellite from the delay time.

According to another aspect of the present invention, the GPS terminal of the Global Positioning system converts a frequency of the GPS signal received; A/D converts the GPS signal passing through the frequency conversion using a sampling signal consisting of a predetermined number of pulses per unit time; stores the GPS signal after the A/D conversion for a predetermined time interval; performs Doppler correction of a carrier frequency of a selected satellite included in the stored GPS signal using local oscillation frequency deviation detection information and Doppler information one of the GPS terminal and the external apparatus provides; performs Doppler correction of a C/A code signal of the selected satellite; performs over a prescribed interval a processing in which corresponding bit values in individual C/A code long blocks of the GPS signal passing through the Doppler correction are multiplied by the navigation data one of the external apparatus and the GPS terminal provides to align polarity of the corresponding bit values, followed by summing up the corresponding bit values over the prescribed interval, and by an averaging processing of the sums; carries out correlation calculation between the averaging results and the C/A code held in the GPS terminal; iterates similar correlation calculations sequentially for the GPS signal stored in the memory over the prescribed interval; scans, when a peak of the correlation calculation values is not obtained, the navigation data by a length of an integer multiple of the C/A code length; obtains a delay time to a peak position of the correlation values; and determines a pseudo range between the GPS terminal and the selected satellite from the delay time.

According to another aspect of the present invention, the Global Positioning system can terminate the correlation calculation when a peak of the correlation calculation values, however small it may be, is obtained.

According to another aspect of the present invention, the Global Positioning system can perform the correlation calculation with scanning the navigation data until a maximum peak of the correlation calculation values is obtained.

According to another aspect of the present invention, the GPS terminal of the Global Positioning system can comprise a GPS radio frequency stage; a frequency converter; a local oscillator; an oscillation frequency deviation detector; an A/D converter; and a digital signal processor that includes a memory for storing C/A codes of all satellites and a computing section.

According to another aspect of the present invention, the oscillation frequency deviation detector of the Global Positioning system can comprise a memory for storing data used for estimating frequency drifts for temperatures, and use, as Doppler correction data, data read from the memory in response to a temperature detected by a temperature sensor for detecting temperature of the local oscillator.

According to another aspect of the present invention, the GPS terminal of the Global Positioning system can set a scanning start position of Doppler correction of the navigation data in accordance with a sum of the Doppler correction data read from the memory in response to the temperature detected by the temperature sensor for detecting the temperature of the local oscillator and the Doppler information one of the external apparatus and GPS terminal provides.

According to another aspect of the present invention, the GPS terminal of the Global Positioning system can receive from an external apparatus a reference signal with higher accuracy than that generated by a reference oscillator installed in the GPS terminal, detect the local oscillation frequency deviation by counting the oscillation frequency over an interval of the reference signal with the higher accuracy; and use detected data as the Doppler correction data.

According to another aspect of the present invention, the Global Positioning system can detect the local oscillation frequency deviation by counting the oscillation frequency over an interval of a reference signal sent from an external apparatus; and set the scanning start position of the Doppler correction of the navigation data in response to a sum of Doppler correction data corresponding to the detected local oscillation frequency deviation and the Doppler information one of the external apparatus and GPS terminal itself provides.

According to another aspect of the present invention, the local oscillator of the Global Positioning system can comprise a reference oscillator, and stabilize an oscillation frequency of the reference oscillator in synchronism with a frequency supplied from an external apparatus with higher accuracy than the oscillation frequency of the reference oscillator.

According to another aspect of the present invention, the Global Positioning system can iterate, when the peak position of the correlation calculation values is not obtained, the scanning of the navigation data until the peak position of the correlation calculation values is obtained with varying at least one of Doppler correction data from an oscillation frequency deviation detector and the Doppler information which is provided by the external apparatus or detected by the GPS terminal.

According to another aspect of the present invention, scanning of the navigation data of the Global Positioning system can utilize a binary scanning method.

According to another aspect of the present invention, the Global Positioning system can generate I signal data and Q signal data with their carrier components removed by multiplying the GPS signal read from the memory by GPS carrier sine data and GPS carrier cosine data which are orthogonal to each other and pass through the frequency conversion; multiply the I signal data and Q signal data by sine data and cosine data of a frequency shift obtained by summing Doppler correction data fed from an oscillator frequency deviation detector and the Doppler data which is provided by the external apparatus or detected by the GPS terminal itself; extract from resultant signals C/A code signals which are Doppler corrected and orthogonal to each other; and carry out correlation calculation of I and Q signals of the C/A code signals, followed by vector composition.

According to another aspect of the present invention, the Global Positioning system can increase the prescribed number of the sampling signal for the A/D conversion which is carried out after the frequency conversion of the received GPS signal.

According to another aspect of the present invention, the GPS terminal of the Global Positioning system can transmit its time signal to a time server that generates an exact time signal, and receive the time signal from the time server to know a traveling time of a signal from the GPS terminal to the server.

According to another aspect of the present invention, the external apparatus of the Global Positioning system can comprise a time server generating an exact time signal, wherein the GPS terminal can transmit its time signal to the time server that generates the exact time signal, receive the time signal from the time server to know a traveling time of a signal from the GPS terminal to the server, and set a scanning start position for multiplying the GPS signal by the navigation data in response to the traveling time.

According to another aspect of the present invention, the scanning of the navigation data of the Global Positioning system can utilize a binary scanning method.

According to another aspect of the present invention, the Global Positioning system can make the correlation calculation interval variable in response to an electric field intensity detected by a received electric field intensity detector for detecting a condition of the received electric field.

According to another aspect of the present invention, the Global Positioning system can make the summing up interval variable in response to a condition of a received electric field.

According to another aspect of the present invention, the GPS terminal of the Global Positioning system can comprise: storing means for storing for a predetermined time interval the received GPS signal that passes through a frequency conversion and an A/D conversion using a sampling signal consisting of a predetermined number of pulses per unit time; dividing means for dividing the GPS signal stored in the storing means by navigation data which is detected by the GPS terminal itself or provided by the external apparatus; sum-up means for performing over a prescribed interval a processing in which the divided GPS signal are multiplied by the navigation data to align polarity, followed by summing up over the prescribed interval; iterating means for iterating similar processing by a number of the navigation data to obtain cumulative results; correlation calculation means for carrying out correlation calculation between the cumulative sums and the C/A code sequence of a selected satellite held in the GPS terminal, and for obtaining a delay time to a peak position of the correlation values; and pseudo range detecting means for determining a pseudo range between the GPS terminal and the selected satellite from the delay time to the peak position. This makes it possible to implement a highly accurate Global Positioning system.

BRIEF DESCRIPTION OF THE DRAWINGS

Other objects and further features of the present invention will be apparent from the following detailed description when read in conjunction with the accompanying drawings, in which:

FIG. 3 is a data table showing correspondence between detected temperatures and frequency drifts;

DETAILED DESCRIPTION OF THE PREFERRED EMBODIMENTS

The invention will now be described with reference to the accompanying drawings.

EMBODIMENT 1

Figure 1:
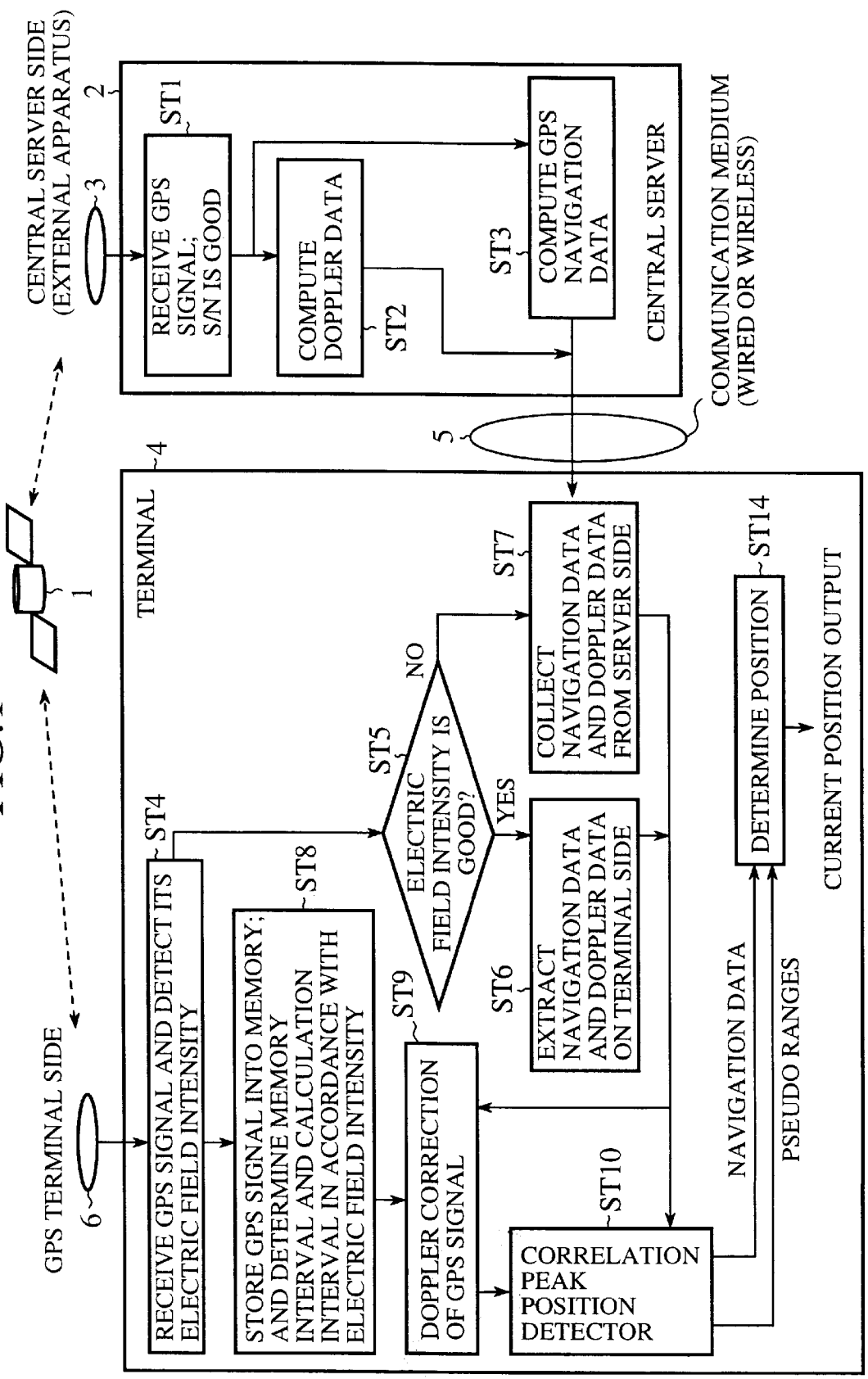
FIG. 1 is a block diagram showing an outline of an operating state of an embodiment 1 of the Global Positioning System and Global Positioning apparatus in accordance with the present invention.

FIG. 1 is a block diagram showing an outline of the operating state of an embodiment 1 of the Global Positioning System and Global Positioning apparatus in accordance with the present invention. In this figure, the reference numeral 1 designates a satellite in view; 2 designates a central server as an external apparatus that has a receiving antenna 3 installed in a vantage location for receiving a GPS signal from the satellite in view 1, and extracts navigation data and Doppler data from the GPS signal; and 4 designates a terminal that is connected to the central server 2 via a wired or wireless communication medium 5, and has a receiving antenna 6 for receiving the GPS signal from the satellite 1.

Next, an outline of the operation of the present embodiment 1 will be described.

First, receiving the GPS signal from the receiving antenna 3 installed in the vantage location, the central server 2 makes a decision as to whether the S/N ratio is good or not (step ST1), calculates Doppler data (step ST2) and calculates GPS navigation data (step ST3).

On the other hand, the terminal 4 detects the intensity of the electric field received by the receiving antenna 6 (step ST4), and makes a decision as to whether the received electric field is good or not (step ST5). If the decision result is positive (YES), the terminal 4 extracts navigation data and Doppler data on the terminal side (step ST6), whereas if the decision result is negative (NO), the terminal 4 collects required navigation data and Doppler data from the central server 2 (step ST7). Subsequently, the terminal 4 determines a memory interval and a calculation interval in accordance with the received electric field intensity, and stores the received GPS signal in the memory (step ST8).

After that, the terminal 4 makes the Doppler correction of the received GPS signal (step ST9), divides the data by the navigation data (steps ST6 and ST7), detects points at which a correlation value takes a maximum value by a correlation peak position detector (step ST10), and obtains a pseudo range from the peak position. The terminal 4 carries out the position computation using the pseudo ranges and the previously extracted navigation data (step ST14), and makes a decision as to whether the received electric field is good or not so that it communicates with the central server 2 only when the received electric field is bad. This makes it possible to markedly reduce the communication cost.

Figure 2:
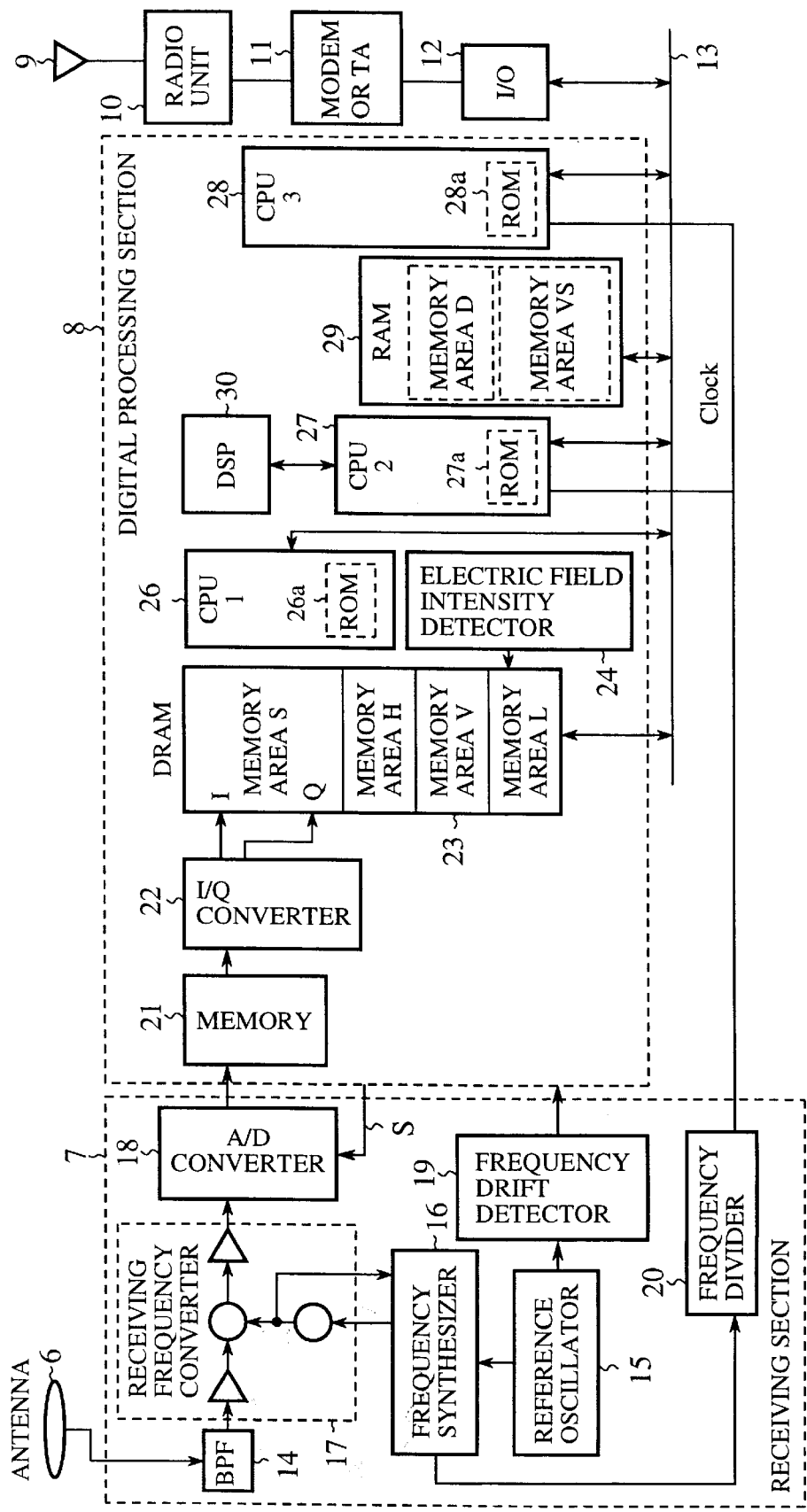
FIG. 2 is a block diagram showing a concrete configuration of a GPS terminal as shown in FIG. 1.

FIG. 2 is a block diagram showing a configuration of a receiver of the GPS terminal. In FIG. 2, the reference numeral 7 designates a receiving section; 8 designates a digital processing section; 9 designates an antenna mounted on a radio unit 10 for exchanging data with the external apparatus 2 by radio; 11 designates a modem (or terminal adapter) connected to the radio unit 10; and 12 designates an I/O (input/output) circuit interposed between the modem 11 and a bus 13.

The receiving section 7 comprises a bandpass filter 14; a reference oscillator 15; a frequency synthesizer 16; a receiving frequency converter 17 for mixing a receiving frequency output from the bandpass filter 14 and a local oscillation frequency output from the frequency synthesizer 16; an A/D converter 18; a frequency drift detector 19 for outputting frequency drifts depending on temperature; and a frequency divider 20 for dividing the output frequency of the frequency synthesizer 16.

The digital processing section 8 comprises a memory 21 for storing sampled data output from the A/D converter 18; an I/Q converter for converting the data read from the memory 21; a memory (DRAM) 23 connected to the bus 13; an electric field intensity detector 24; CPUs 26, 27 and 28 connected to the bus 13; a memory (RAM) 29 connected to the bus 13; and a DSP 30 connected to the CPU 27. The CPUs 26–28 comprise memories (ROM) 26a–28a, respectively.

The frequency drift detector 19 detects, for example, the temperature of the reference oscillator 15 by means of a sensor (not shown), and outputs the frequency drifts by reading them from the data table as shown in FIG. 3 which stores the correspondence between the detected temperatures and frequency drifts in advance.

Figure 4:
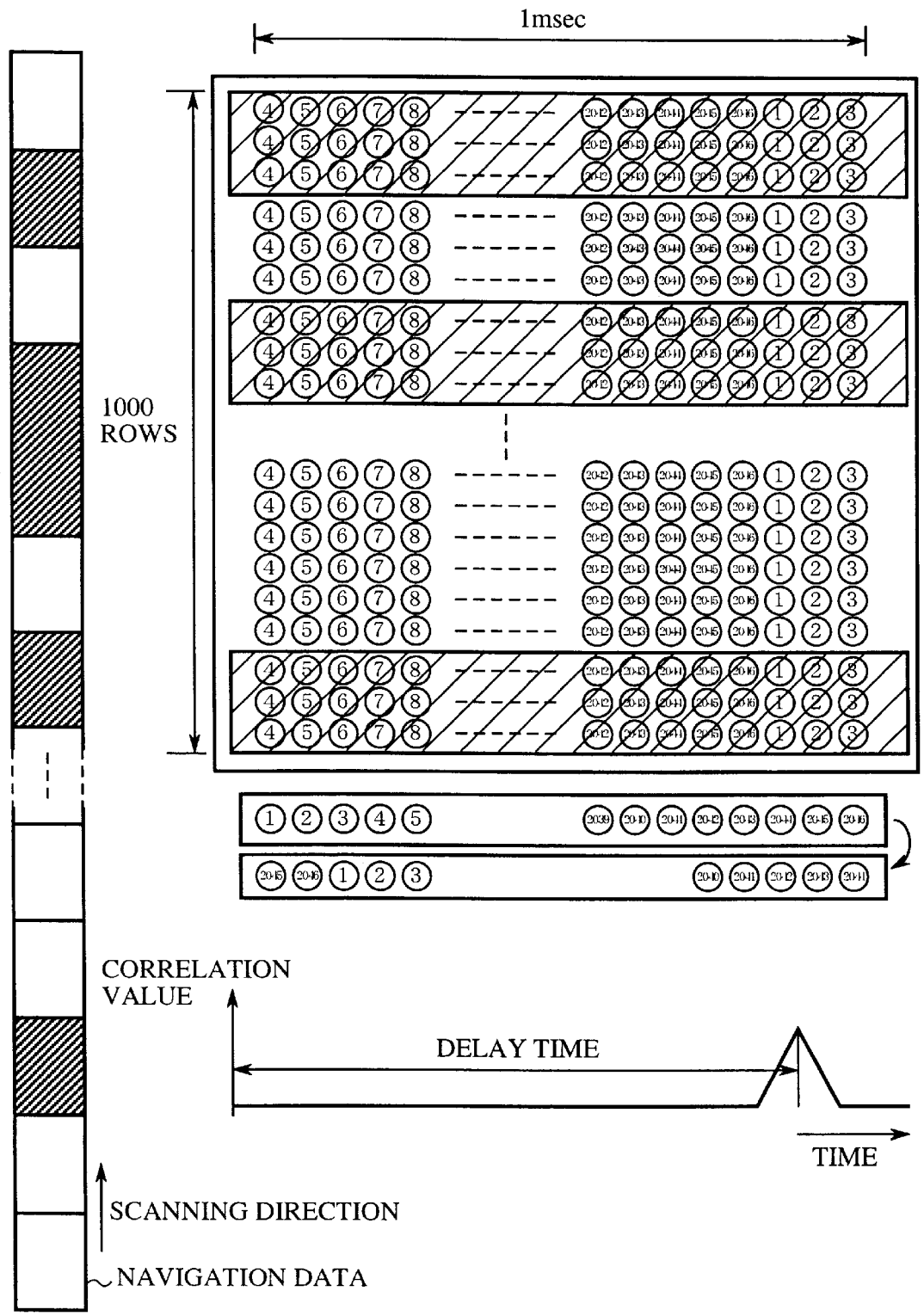
FIG. 4 is a diagram illustrating a stored state in a memory for storing the output of an A/D converter which performs sampling using a sampling signal.

FIG. 4 is a schematic diagram illustrating a stored state of sampled data which are output from the A/D converter 18 carrying out the sampling using a sampling signal, and are stored in the memory 21 in the digital processing section 8 at every sampling interval. In this figure, each row consists of 2046 sampled data for one millisecond, and 1000 rows are stored. In this example, although the shadowed portions each consist of four rows, they actually consist of 40 rows in which a polarity inversion of the navigation data can take place.

Figure 5:
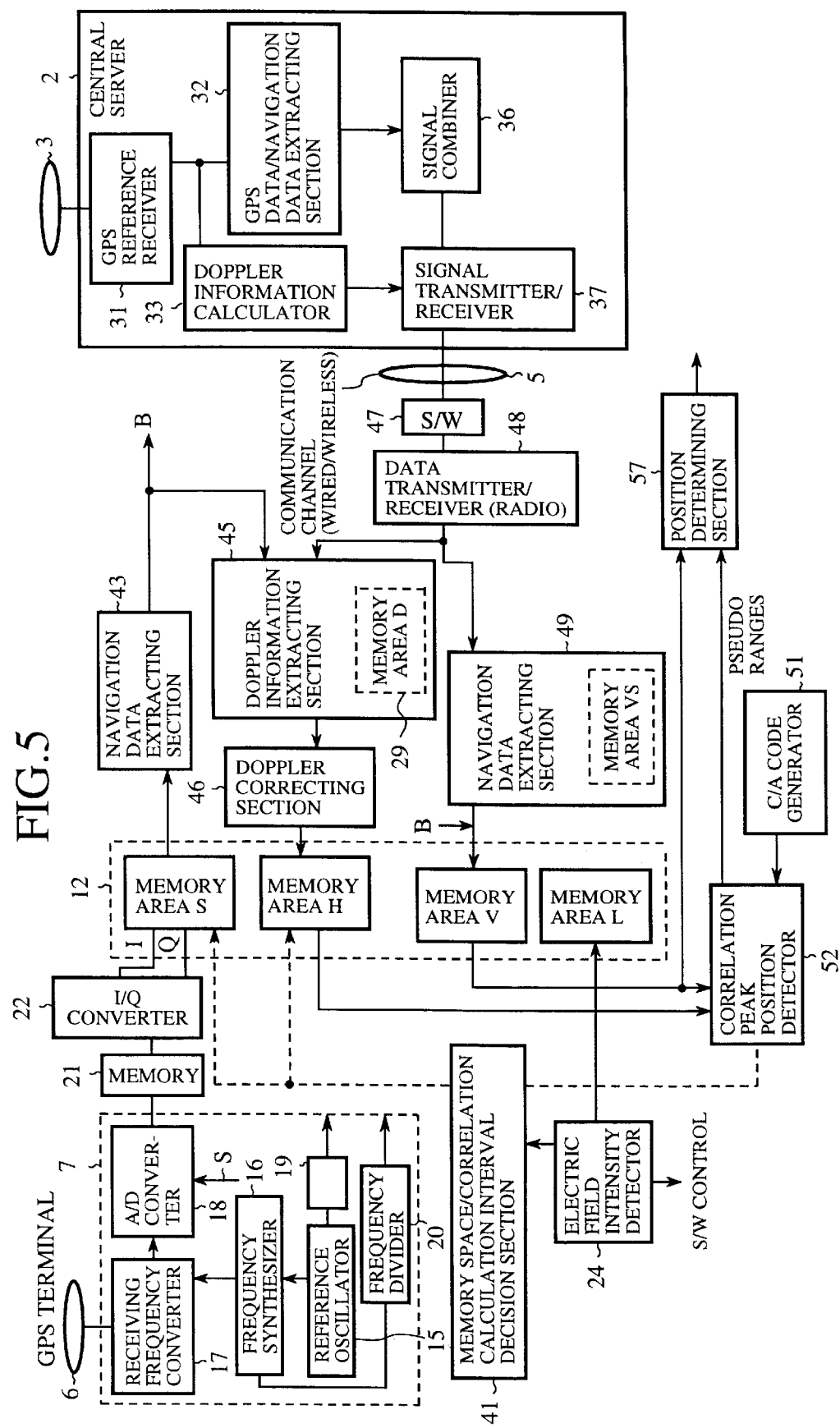
FIG. 5 is a block diagram showing a detailed configuration of the GPS terminal as shown in FIG. 2.

FIG. 5 is a block diagram showing the GPS terminal 4 as shown in FIG. 2 in more detail, in which the same reference numerals designate the same or like portions to those of FIG. 2, and the description thereof is omitted here. The central server 2 comprises a GPS reference receiving section 31, a navigation data extracting section 32 for extracting navigation data contained in the GPS data, a Doppler information computing section 33, a signal combiner 36 and a signal transmitter and receiver 37.

The GPS terminal 4 comprises an interval determining section 41 for determining an interval of the memory space and that of the correlation calculation in response to the output of the received electric field intensity detector 24; a navigation data extracting section 43 connected to a memory area S; a data transmitting and receiving section 48 connected to the communication medium 5 via a switch 47; a Doppler information extracting section 45 connected to the output of the navigation data extracting section 43 and to the output of the data transmitting and receiving section 48; a Doppler correction section 46 connected to the memory area H; a navigation data extracting section 49 connected to the output of the data transmitting and receiving section 48; and a position determining section 57 for determining the position from the pseudo ranges and the navigation data fed from the memory area V. The pseudo ranges are obtained by detecting correlation between the output of the memory area V and the output of a C/A code sequence generator 51 by a correlation peak position detector 52.

The sections from the navigation data extracting section 43 to the position determining section 57 are not separately installed, but their functions are carried out by the digital processing section 8 comprising the CPUs 26–28 and the DSP 30, for example. Besides, although the three CPUs are shown for the sake of simplifying the description, a single CPU can accomplish the same functions in practice. Next, the operation of the present embodiment 1 will be described.

Figure 6:
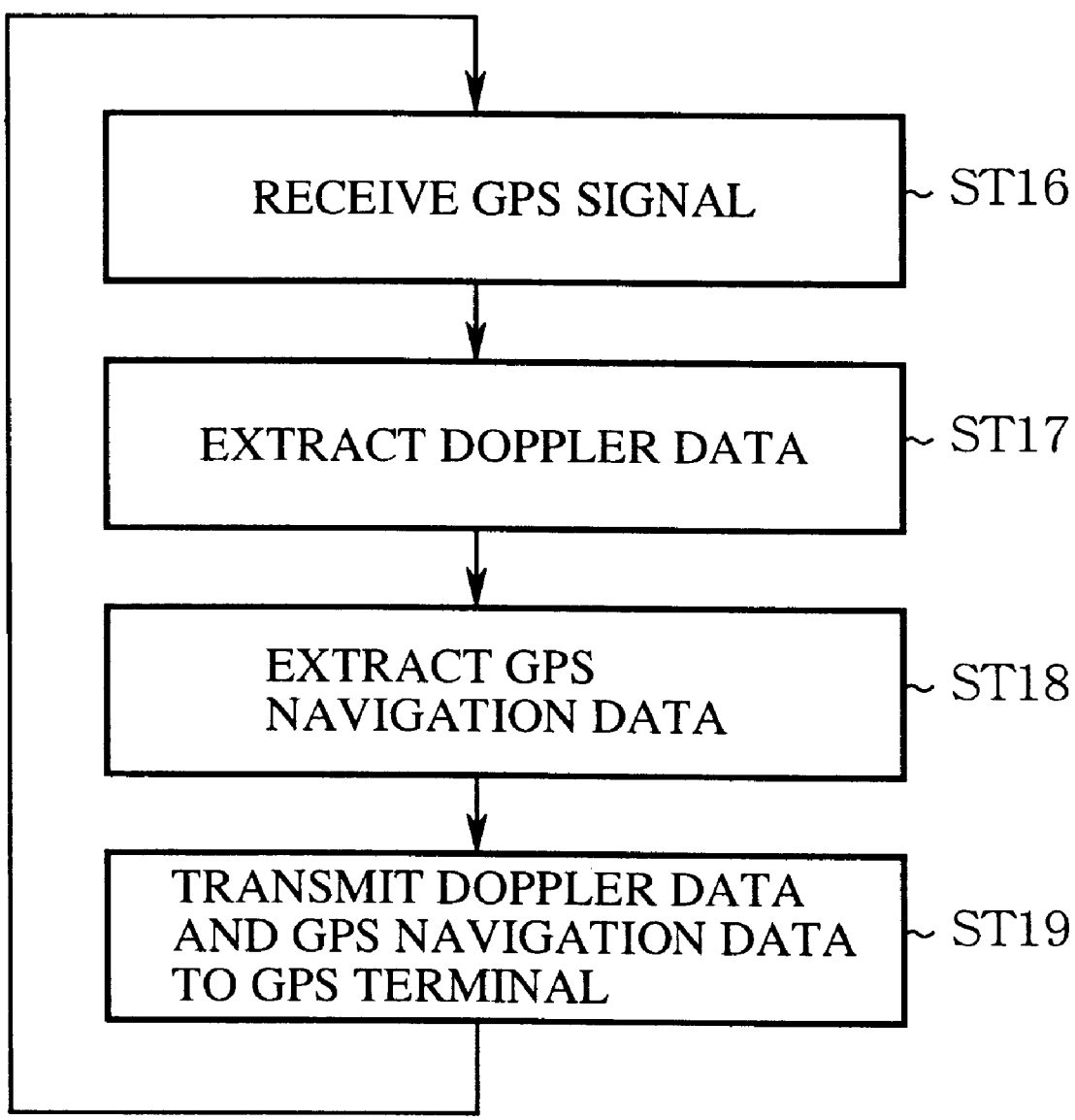
FIG. 6 is a flowchart illustrating the operation of a central server.

FIG. 6 is a flowchart illustrating the operation of the central server 2. In the central server 2, the GPS reference receiving section 31 receives the GPS signal (step ST16), first. Subsequently, the Doppler information computing section 33 calculates the Doppler shift (step ST17); the navigation data extracting section 32 extracts the GPS navigation data (step ST18); and the signal combiner 36 combines them. Then, in response to a request for the data sent from the GPS terminal 4, the signal transmitter and receiver 37 transmits the Doppler shift and the navigation data to the GPS terminal 4 (step ST19).

Figure 7:
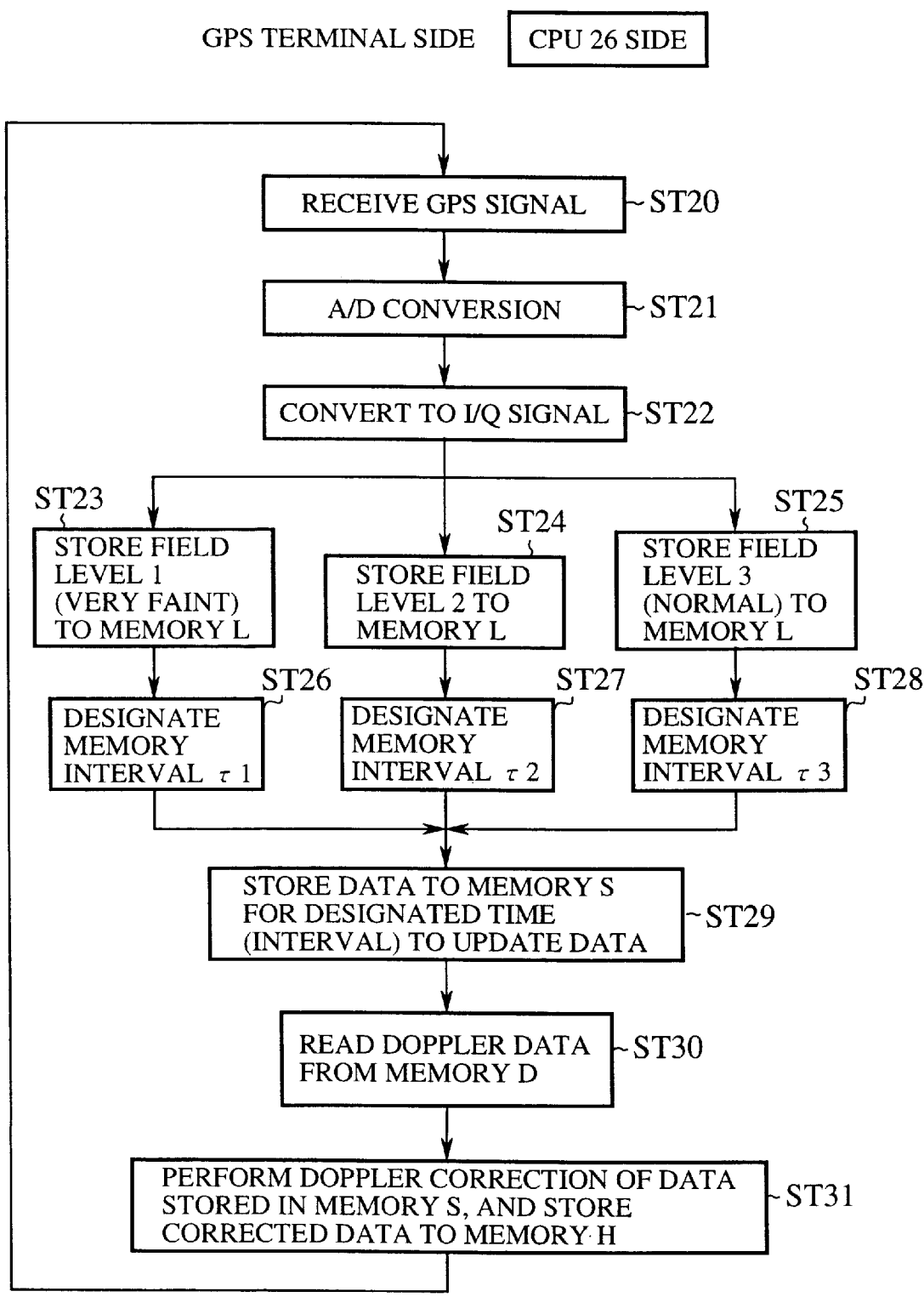
FIG. 7 is a flowchart illustrating the operation of a CPU 26 in the Global Positioning System and Global Positioning apparatus.
Figure 8:
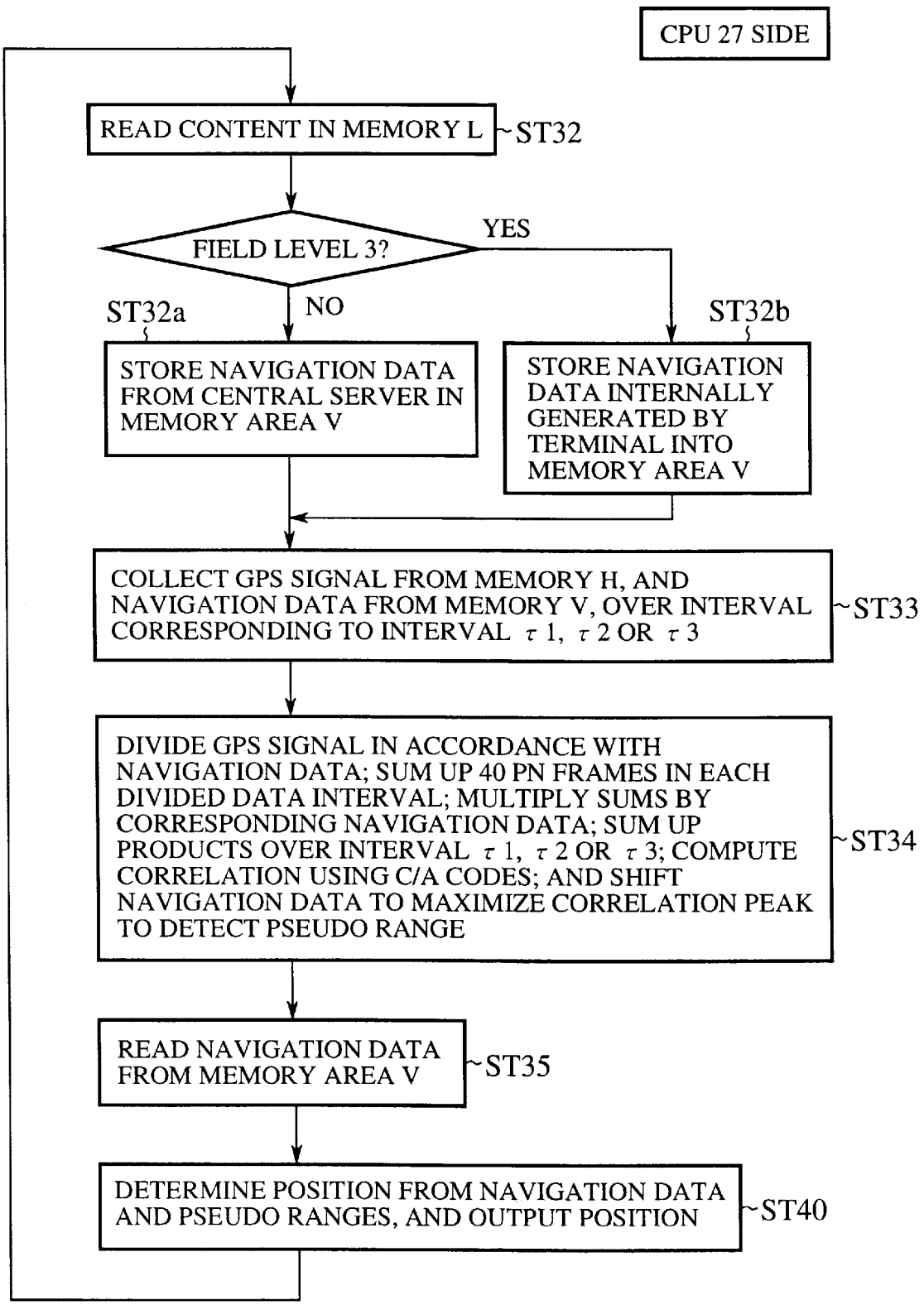
FIG. 8 is a flowchart illustrating the operation of a CPU 27 in the Global Positioning System and Global Positioning apparatus.
Figure 9:
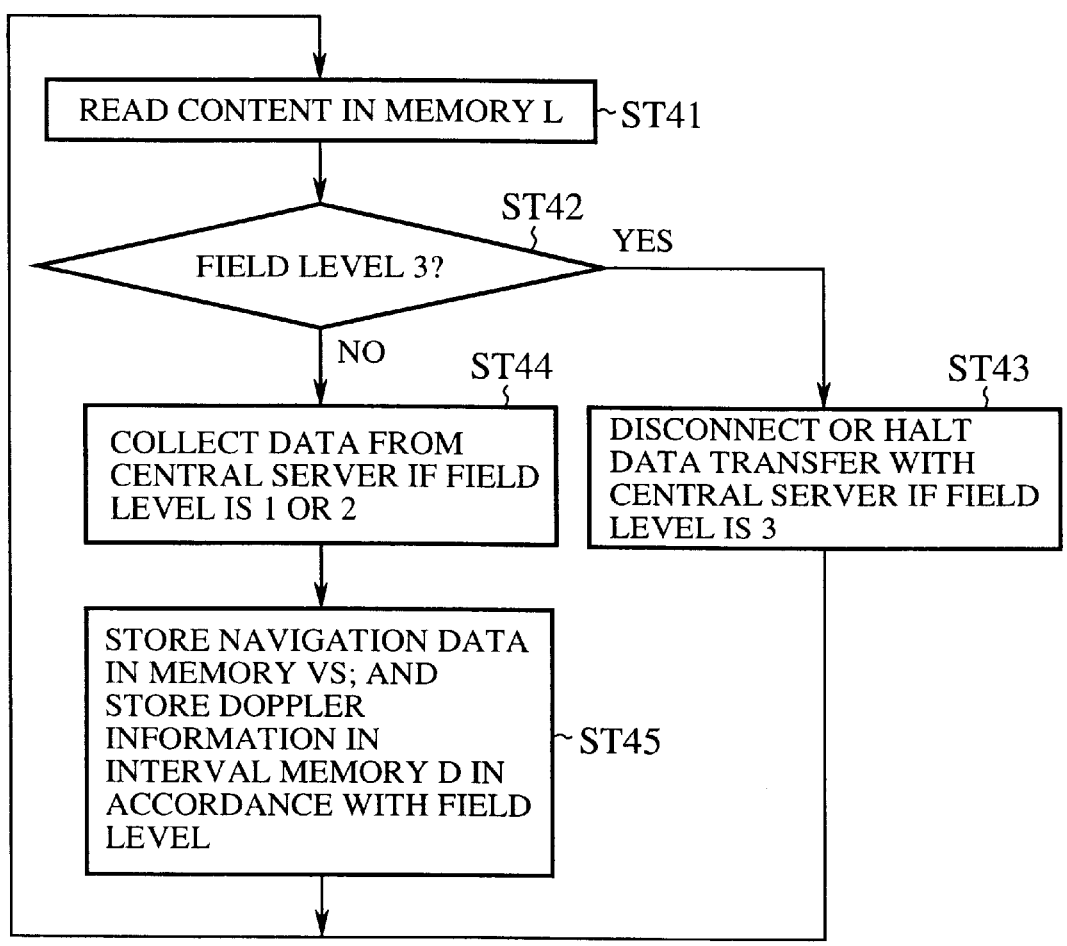
FIG. 9 is a flowchart illustrating the operation of a CPU 28 in the Global Positioning System and Global Positioning apparatus.

FIGS. 7–9 are flowcharts illustrating operations of the CPUs 26–28 in the Global Positioning System and Global Positioning apparatus. First, on the CPU 26 side in the GPS terminal 4, the antenna 6 receives the GPS signal (step ST20), and supplies the received GPS signal to the received frequency converter 17 which converts it to a predetermined frequency using the local oscillation frequency fed from the reference oscillator 15 via the frequency synthesizer 16. Subsequently, the A/D converter samples the output of the received frequency converter 17 using a sampling signal S including a prescribed number (2046, for example) of sampling pulses per unit time (one millisecond, for example), and stores the sampled data in the memory 21 as illustrated in FIG. 4 for that time interval (step ST21).

Figure 10:
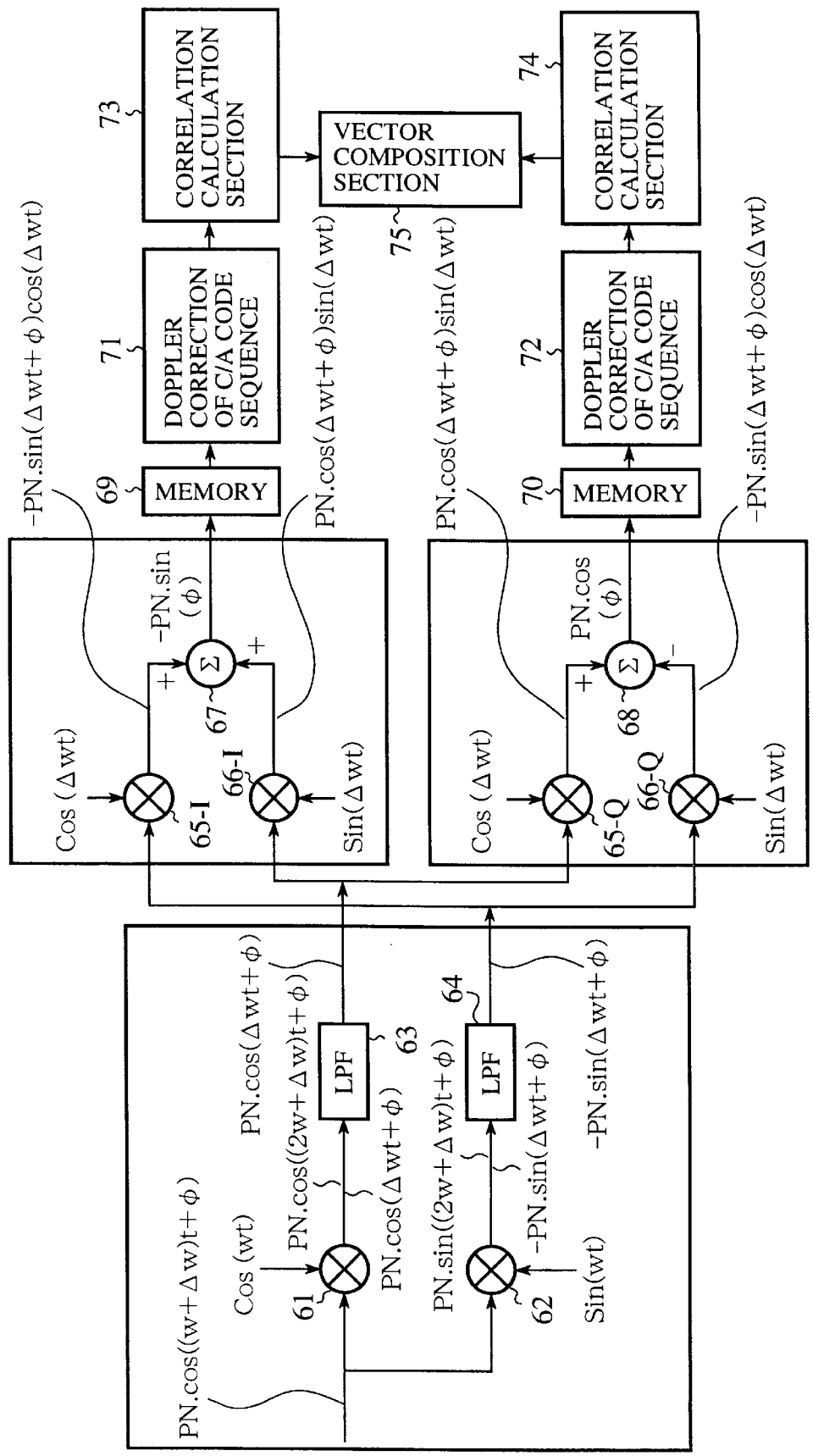
FIG. 10 is a circuit diagram illustrating a method of generating an I signal and Q signal from a GPS signal.

After that, as illustrated in FIG. 10, multipliers 61 and 62 multiply the data read from the memory 21, that is, the GPS signal, by GPS carrier sine data "Sin($\omega$t)" and GPS carrier cosine data "Cos($\omega$t)" which are orthogonal to each other, followed by passing through lowpass filters (LPFs) 63 and 64 to eliminate carrier components, thus generating the I signal and Q signal. Subsequently, multipliers 65-I and 66-I, and 65-Q and 66-Q multiply the I signal and Q signal by sine data and cosine data associated with frequency fluctuations. Here, the frequency fluctuations are obtained by adding the Doppler correction information to the Doppler information, in which the Doppler correction information is fed from the frequency drift detector 19 operating as an oscillation frequency drift detector, and the Doppler information is internally detected by the GPS terminal itself or fed from the central server 2 operating as the external apparatus. Then, an adder 67 sums up the outputs of the multipliers 65-I and 66-I, and an adder 68 sums up the outputs of the multipliers 65-Q and 66-Q, thereby extracting orthogonal signals passing through the Doppler correction in terms of the carrier frequency of the GPS signal after the frequency conversion. The signals are stored in memories 69 and 70 (step ST22).

On the other hand, the received electric field intensity detector 24 detects and determines the received electric field intensity: an electric field level 1 (extremely faint); an electric field level 2; or an electric field level 3 (steps ST23–ST25). A memory interval and correlation calculation interval determining section 41 determines in response to the electric field level a memory interval $\tau$1, a memory interval $\tau$2 or a memory interval $\tau$3 (steps ST26–ST28), and stores (updates) the GPS signal passing through the A/D converter 18 into the memory area S in the memory 12 in accordance with the time interval determined above (step ST29).

The navigation data extracting section 43 reads the content of the memory area S to extract the navigation data. The Doppler information extracting section 45 extracts the Doppler information from the signal fed from the navigation data extracting section 43, or from the signal sent from the central server 2 fed via the data transmitting and receiving section 48, and stores the Doppler information to a memory area D. The Doppler correction section 46 reads the data from the memory area D (step ST30), carries out the Doppler correction of the data in the memory area S, and stores the corrected data in the memory area H (step ST31).

Figure 11:
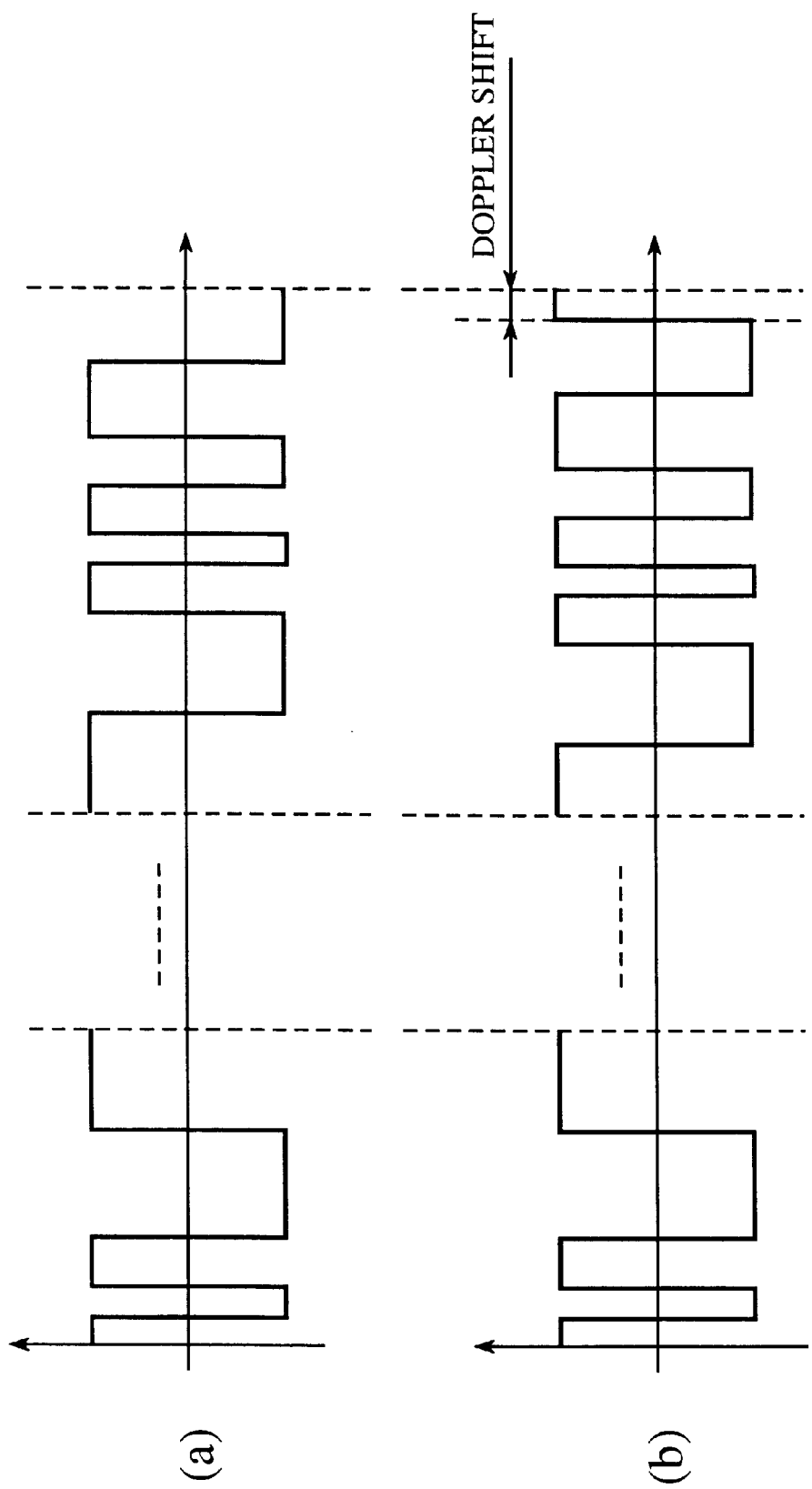
FIG. 11 is a diagram illustrating Doppler correction of a C/A code.

Subsequently, C/A code Doppler correcting sections 71 and 72, being supplied with the data read from the memories 69 and 70, carry out the Doppler correction of the I and Q components of the C/A code sequence each. The term "Doppler. correction of the C/A code sequence" refers to data interpolation of the received GPS signal with frequency variations. For example, as illustrated in FIG. 11(b), a Doppler shift d takes place in the case of Doppler shift, as compared with the case where no Doppler shift takes place as illustrated in FIG. 11(a). This means that a row of FIG. 4 consisting of 2046 samples to be stored in one millisecond becomes shorter than one millisecond.

Taking account of this, the C/A code Doppler correction can be performed by reading the data from the memories 69 and 70, and by carrying out the following calculation, so that the length of the 2046 sampled data is adjusted to one millisecond.

$$PN = PN_d \times 1 + (f_d/f_0)$$

Accordingly, the interpolation frequency becomes $$2046 \times 10^6 \times (f_0 + f_d/f_0) \text{ Hz}$$

where

PN is the sampled signal after the Doppler correction;

$PN_d$ is the sampled signal before the Doppler correction;

$f_d$ is the frequency shift due to the Doppler effect; and $f_0$ is the GPS carrier signal frequency.

The corrected signal becomes identical to the signal as illustrated in FIG. 11(a).

Subsequently, on the CPU 27 side, it reads the content of the memory area L which stores the received electric field intensity level 1, 2 or 3 detected by the received electric field intensity detector 24 (step ST32), and when the electric field level is 3, the CPU 27 reads the navigation data from the memory area V that stores the navigation data fed from the navigation data extracting section 43 (step ST32b). On the other hand, when the electric field level is 1 or 2, the CPU 27 reads the navigation data which is sent from the central server 2 and stored in the memory area V via the transmitting and receiving section 48 and the navigation data extracting section 49 (step ST32a). Then, the CPU 27 collects the GPS signal and navigation data from the memory areas H and V, respectively, in the interval corresponding to the determined memory interval τ1, τ2 or τ3 (step ST33).

The correlation peak position detector 52 divides the GPS signal read out of the memory area H into a plurality of data blocks in accordance with the navigation data read out of the memory area V; sums up the corresponding bits in the 40 PN frames of the C/A code sequence; and computes the correlation between the summed up C/A code sequence and the C/A code sequence generated by the C/A code sequence generator 51. The process is carried out over the memory interval τ1, τ2 or τ3. Afterward, the navigation data is shifted along the time axis such that the correlation peak value becomes maximum, and the same correlation calculations are iterated to determine the correlation peak positions as the boundaries of the polarity inversion of the navigation data, and as the pseudo ranges (ST34). Then, the position computation is carried out from the navigation data and the pseudo ranges, and the result is output (steps ST35 and ST40).

On the CPU 28 side, it reads the content in the memory area L (step ST41), and decides as to whether the electric field level is equal to or greater than 3 (step ST42). If the decision result is positive (YES), the CPU 28 turns off the switch 47 to disconnect the central server 2, thereby halting data transferring (step ST43). In contrast, if the decision result is negative (NO), the CPU 28 turns on the switch 47 to collect the data from the central server 2 (step ST44), and stores the navigation data to the memory area VS and the Doppler information fed from the Doppler information extracting section 45 in the memory area D for the interval corresponding to the received electric field level (step ST45).

As described above, the present embodiment 1 is configured such that it decides the level of the received electric field, and makes a communication with the central server 2 only when the received electric field is insufficient. This makes it possible to markedly reduce the communication cost. Furthermore, the present embodiment 1 is configured such that the correlation peak position detector sums up the values at the same bit positions in the individual periods of the regularly arranged C/A codes consisting of multiple chips, and sums up the C/A code sequence using the changing boundary from an increase to decrease or vice versa in the cumulative sum result as the start point of the data summation. This makes it possible to solve the problem in the conventional system in that only insufficient improvement in the sensitivity (S/N ratio) is achieved because the signal components are canceled out in the integral (cumulative sum) because of the polarity of the navigation data. Thus, a high sensitivity Global Positioning System can be implemented by positively detecting the C/A code sequence buried in noise, and the pseudo ranges.

An example of the correlation peak position detector 52 for determining the peak position by the correlation processing will now be described in more detail.

The correlation peak position detector 52 carries out the following steps: it successively divides the regularly arranged C/A code sequence consisting of a lot of bits into a length of the navigation data beginning from any desired position; takes a cumulative sum of the corresponding bit positions of the divided C/A codes; sums up the resultant cumulative sums with matching their polarities in accordance with the navigation data detected in the GPS terminal or with the navigation data sent from the central server; carries out the correlation calculation between the summed up results and the C/A code sequence of all the associated satellites to obtain the correlation peak position, and adopts the correlation peak position as the start position of the data summation.

Figure 12:
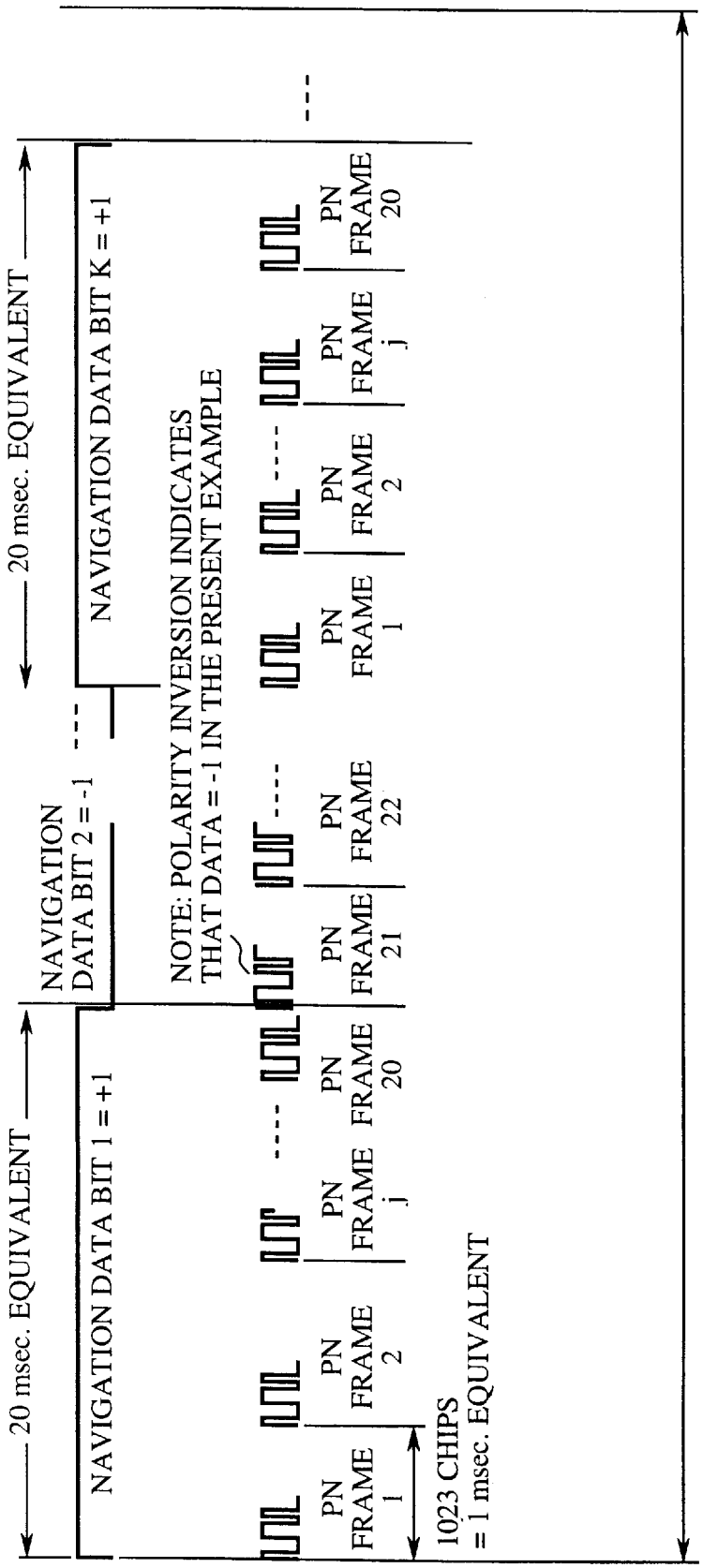
FIG. 12 is a diagram showing data of a GPS signal (C/A code sequence)

FIG. 12 illustrates the relationship between the number of PN frames and the number of chips when the navigation data length is M.

As shown in this figure, each navigation data consists of 20 PN frames, and one PN frame consists of 1023 chips. Thus, one PN frame (C/A code=PN code) of the GPS signal passing through the Doppler correction and stored in the memory consists of 1023 chips.

Although each C/A code of the GPS signal consists of 1023 chips, the A/D converter must convert it at a sampling rate twice that or greater for accurate transmission of the information according to the sampling theorem. Thus, the number of the signal sampling of the memory S and memory V is twice that or greater. For example, the 1023 chips are stored in the number of samples of 1023×2i (i=1, 2, 3), for example.

For the sake of simplicity, the following description is made in terms of the chip of the C/A code sequence.

In FIG. 7, the CPU 26 carries out the Doppler correction on the basis of the Doppler information (Doppler frequency shift for each satellite) read from the memory D (steps ST30 and ST31), and stores the corrected values to the memory H. As for the signal undergone the Doppler correction by the CPU 27 of FIG. 8, the regularly arranged C/A code sequence consisting of multiple bits is divided by the navigation data length beginning from an arbitrary position. Subsequently, beginning from the initial divided position, the sampled data at corresponding positions at every C/A code (=1023 bits) intervals (=1023×2i, where i=1, 2 or 3) are subjected to the first summation over the interval of one data (=20 frames, =20×2046 bits).

For the sake of simplicity, the following description is made in terms of the chip of the C/A code sequence. The stored GPS data is continuous regular data consisting of the PN frame sequence, and the phase of the C/A code sequence (PN code sequence) may be reversed in accordance of the polarity of each 20 millisecond long navigation data. A phase inversion position of the C/A code sequence agrees with the initial position of the navigation data when the navigation data changes.

Figure 13:
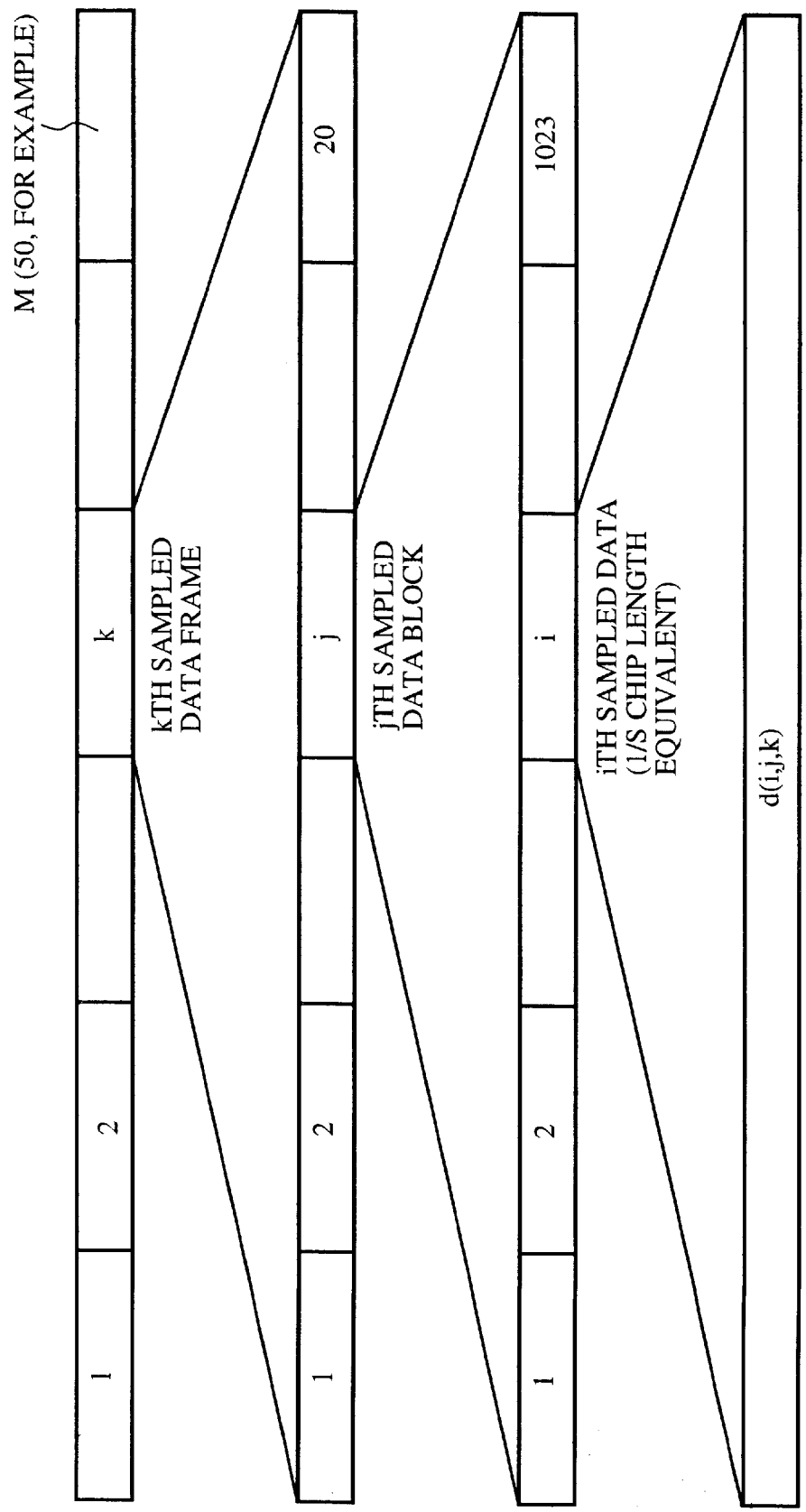
FIG. 13 is a diagram showing a data structure of the GPS signal (C/A code sequence)

FIG. 13 shows the relationships when the interval is M in terms of the navigation data length. In this figure, the data of an ith chip in a jth PN frame in a kth navigation data is extracted and stored in the memory over a prescribed time interval (M navigation data in the present embodiment). It is unknown where the data starts in the GPS signal.

Figure 14:
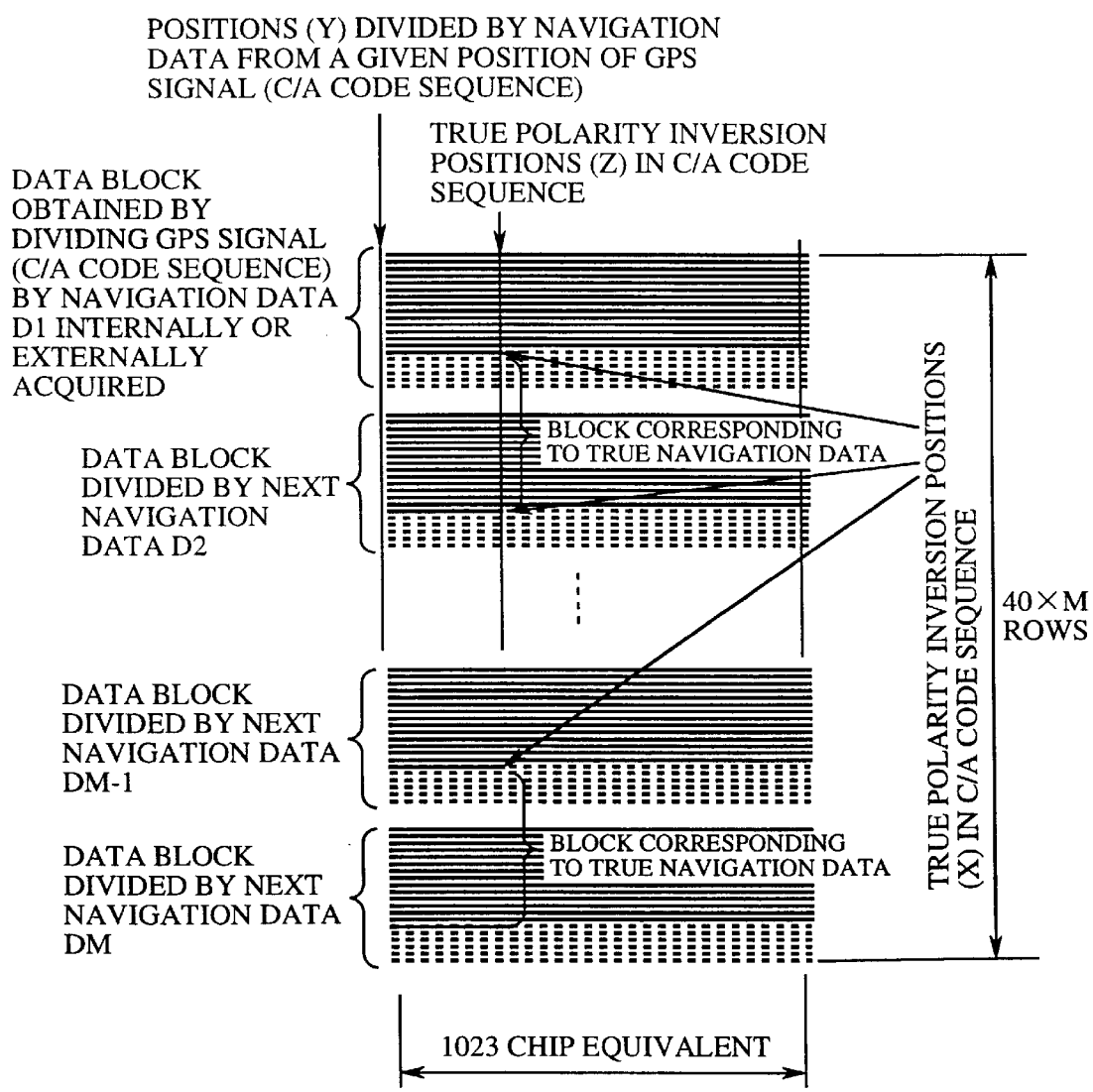
FIG. 14 is a diagram illustrating a method of detecting polarity inversions in navigation data.

FIG. 14 illustrates the data stored in the memory. The GPS signal (C/A code sequence) is divided at every internal or external navigation data length, and the data corresponding to M navigation data are stored in the memory. Thus, the total of 2046×40 ×M chips of the C/A code sequence corresponding to the M navigation data captured from any desired portion are stored in the memory.

In FIG. 14, the data stored in the memory are shown in a 2046×40×M matrix formed by extracting 40×M row navigation data with each row including 2046 chips (corresponding to 2PN frames). Thus, the chip data next to the 2046th column of the first row is the data at the first column of the second row. Likewise, the data next to the 2046th column of the second row is the data at the first column of the third row with iterating such arrangement up to M×40 rows and 2046 columns.

When dividing the GPS signal (navigation data) by every external or internal navigation data from a given position, the initial positions of the divisions usually disagree with the initial positions at which the phase inversion of the GPS signal takes place (the actual initial positions of the navigation data in the GPS signal). The correlation peak position detector tries to match them as much as possible by the following process.

Figure 15:
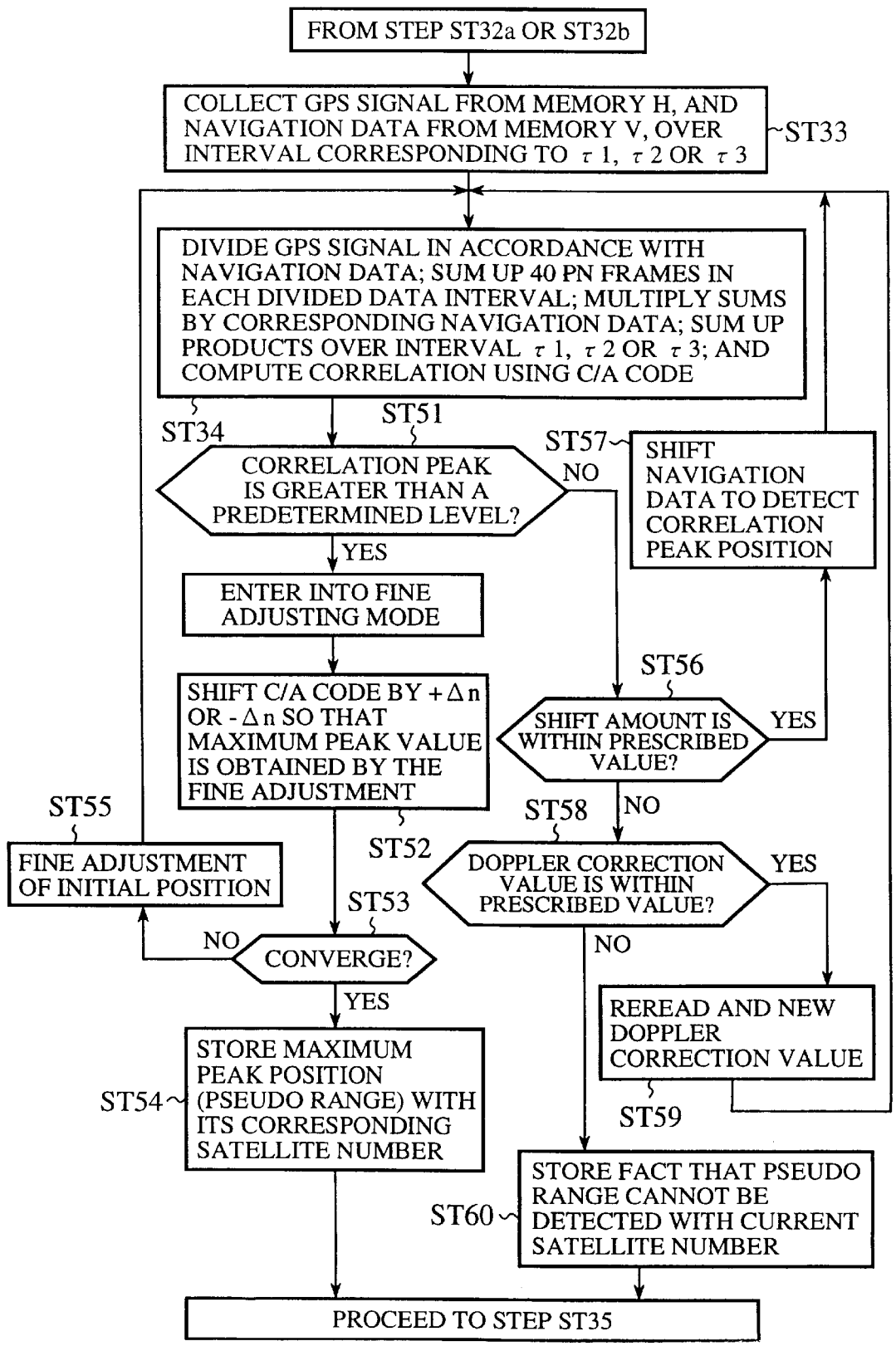
FIG. 15 is a flowchart illustrating a correlation calculation process for detecting polarity inversions in navigation data.

This will be described in more detail with reference to FIG. 15.

First, in FIG. 14, the data elements in the 40×2023 matrix obtained by dividing the GPS signal in accordance with the navigation data $D_k$ are defined by $d(i,j,k)$. Then, the following sums are calculated.

$$S_1(D_1)=d(1,1,1)+d(2,1,1)+d(3,1,1)+ \ldots +d(40,1,1)$$

$$S_2(D_1)=d(1,2,1)+d(2,2,1)+d(3,2,1)+ \ldots +d(40,2,1)$$

$$S_3(D_1)=d(1,3,1)+d(2,3,1)+d(3,3,1)+ \ldots +d(40,3,1)$$

$$S_i(D_1)=d(1,i,1)+d(2,i,1)+d(3,i,1)+ \ldots +d(40,i,1)$$

$$S_{2046}(D_1)=d(1,1023,1)+d(2,1023,1)+ \ldots +d(40,1023,1)$$

Subsequently, the sums $S_1(D_1)$, $S_2(D_1)$, ... $S_i(D_1)$, ... $S_{2046}(D_1)$ are each multiplied by the data $D_1$ (=−1 or +1), thereby obtaining the following products.

$$D_1 \times S_1(D_1), D_{1 \times S2}(D_1) \ldots, D_1 \times S_i(D_1), \ldots, D_{1 \times S2046}(D_1).$$

Likewise, as for the data divided in accordance with the navigation data D2, the following sums are calculated.

$$S_1(D_2)=d(1,1,2)+d(2,1,2)+d(3,1,2)+ \ldots +d(40,1,2)$$

$$S_2(D_2)=d(1,2,2)+d(2,2,2)+d(3,2,2)+ \ldots +d(40,2,2)$$

$$S_3(D_2)=d(1,3,2)+d(2,3,2)+d(3,3,2)+ \ldots +d(40,3,2)$$

$$S_i(D_2)=d(1,i,2)+d(2,i,2)+d(3,i,2)+ \ldots +d(40,i,2)$$

$$S_{2046}(D_2)=d(1,2046,2)+d(2,2046,2)+ \ldots +d(40,2046,2)$$

Subsequently, the sums $S_1(D_2)$, $S_2(D_2)$, ... $S_i(D_2)$, ... $S_{2046}(D_2)$ are each multiplied by the data $D_2$ (=−1 or +1), thereby obtaining the following products. $D_2 \times S_1(D_2)$, $D_2 \times S_2(D_2)$, ..., $D_2 \times S_i(D_2)$, ..., $D_2 \times S_{2046}(D_2)$.

In just the same manner, as for the data divided in accordance with the navigation data DM, the following sums are calculated.

$$S_1(D_M)=d(1,1,M)+d(2,1,M)+d(3,1,M)+ \ldots +d(40,1,M)$$

$$S_2(D_M)=d(1,2,M)+d(2,2,M)+d(3,2,M)+ \ldots +d(40,2,M)$$

$$S_3(D_M)=d(1,3,M)+d(2,3,M)+d(3,3,M)+ \ldots +d(40,3,M)$$

$$S_i(D_N)=d(1,i,M)+d(2,i,M)+d(3,i,M)+ \ldots +d(40,i,M)$$

$$S_{2046}(D_M)=d(1,2046,M)+d(2,2046,M)+ \ldots +d(40,2046,M)$$

Subsequently, the sums $S_1(D_M)$, $S_2(D_M)$, ... $S_i(D_M)$, ... $S_{2046}(D_M)$ are each multiplied by the data $D_M$ (=−1 or +1), thereby obtaining the following products.

$$D_M \times S_1(D_M), D_M \times S_2(D_M), \ldots, D_M \times S_i(D_M), \ldots, D_M \times S_{2046}(D_M).$$

After that, the following data are calculated.

$$C_1 = D_{1 \times S1}(D_1)+D_2 \times S_1(D_2)+ \ldots +D_M \times S_1(D_M)$$

$$C_2 = D_1 \times S_2(D_1)+D_2 \times S_2(D_2)+ \ldots +D_M \times S_2(D_M)$$

$$C_3 = D_1 \times S_3(D_1)+D_2 \times S_3(D_2)+ \ldots +D_M \times S_3(D_M)$$

$$C_4 = D_1 \times S_4(D_1)+D_2 \times S_4(D_2)+ \ldots +D_M \times S_4(D_M)$$

$$C_{2046} = D_1 \times S_{2046}(D_1)+D_2 \times S_{2046}(D_2)+ \ldots +D_M \times S_{2046}(D_M)$$

Then, the correlation is calculated between the data sequence consisting of the elements $C_1$, $C_2$, $C_3$, $C_4$, ..., $C_{2046}$ and the 2046 data elements in the C/A code sequence generated inside the GPS terminal 4 (step ST34).

Figure 16:
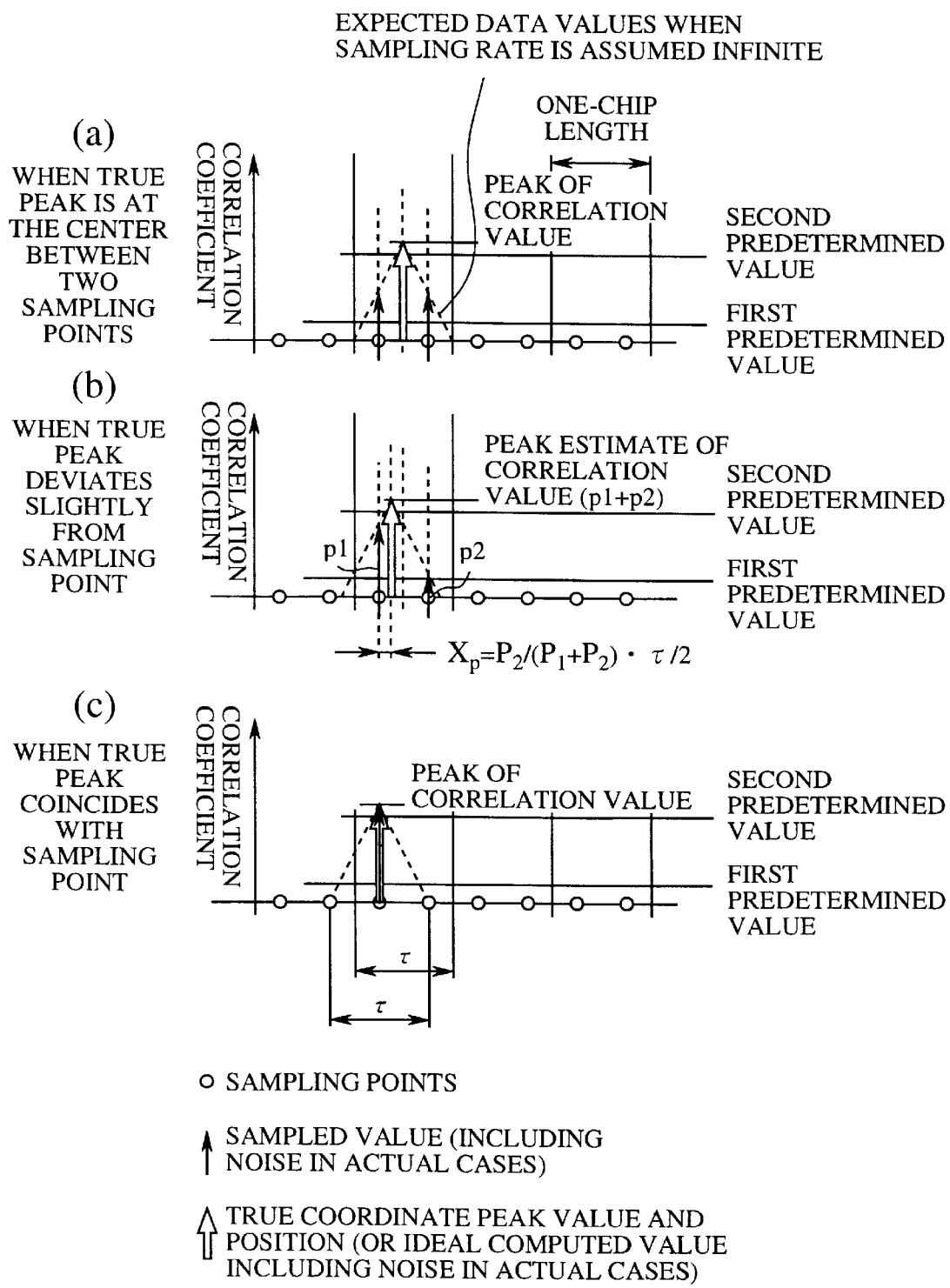
FIG. 16 is a diagram illustrating processings of correlation results (correlation peak data) between secondary sum results and a C/A code.

The accuracy of the correlation calculation values will increase with the number of the sampling points. FIG. 16 shows an example of providing two sampling points per bit to improve the accuracy of the correlation peak position: FIG. 16(*a*) illustrates a case where a true peak comes at the center of the two sampling points; 16(*b*) illustrates a case where the true peak slightly deviates from a sampling point; and 16(*c*) illustrates a case where the true peak agrees with one of the sampling points. Here, the peak position Xp (local position from the sampling point) is obtained by $Xp=P_2/(P_1+P_2)\cdot\tau/2$, where τ is a bit length.

Subsequently, the CPU 27 makes a decision as to whether the correlation peak value is equal to or greater than a predetermined value (step ST51). If the decision result at step ST51 is positive (YES), the CPU 27 enters into a fine adjusting mode. Specifically, it searches for a convergent point at which the peak value becomes greatest with shifting the navigation data by a very small value of +Δn chip or −ΔAn chip (step ST52).

If the CPU 27 finds the convergent point at step ST53, it obtains the correlation peak position Xp, and stores the maximum peak position (pseudo range) with the corresponding satellite number (step ST54).

If the decision result at step ST53 is negative (NO), the CPU 27 iterates the fine adjustment of the navigation data with slightly shifting it by +Δn chip or −Δn chip until it converges at step ST53, and if it converges within the predetermined value, the CPU obtains the correlation peak position Xp, and stores the maximum peak value (pseudo range) with the corresponding satellite number (step ST54).

In contrast, if the decision result at step ST51 is negative (NO), the CPU 27 sequentially shift each navigation data such that it can detect the correlation peak position, and iterates steps ST34–ST57 with shifting the navigation data until the correlation peak exceeds the predetermined level at step ST51. If the shift amount exceeds a prescribed value at step ST56 in the iteration loop, the CPU 27 decides at step ST58 whether the Doppler correction value is normal or not. If the Doppler correction value is within a prescribed value, the CPU rereads and corrects the Doppler correction value again at step ST59, and iterates the step ST54. In the course of this, if the Doppler correction value exceeds the prescribed value at step ST58, the CPU 27 makes a decision that it cannot detect the pseudo range with the present satellite, stores the result with the satellite number (step ST60), and proceeds to obtaining pseudo ranges with other satellites.

The foregoing steps ST34, ST51–ST54 and ST56–ST59 are processings for distinguishing the correlation peak position.

Figure 17:
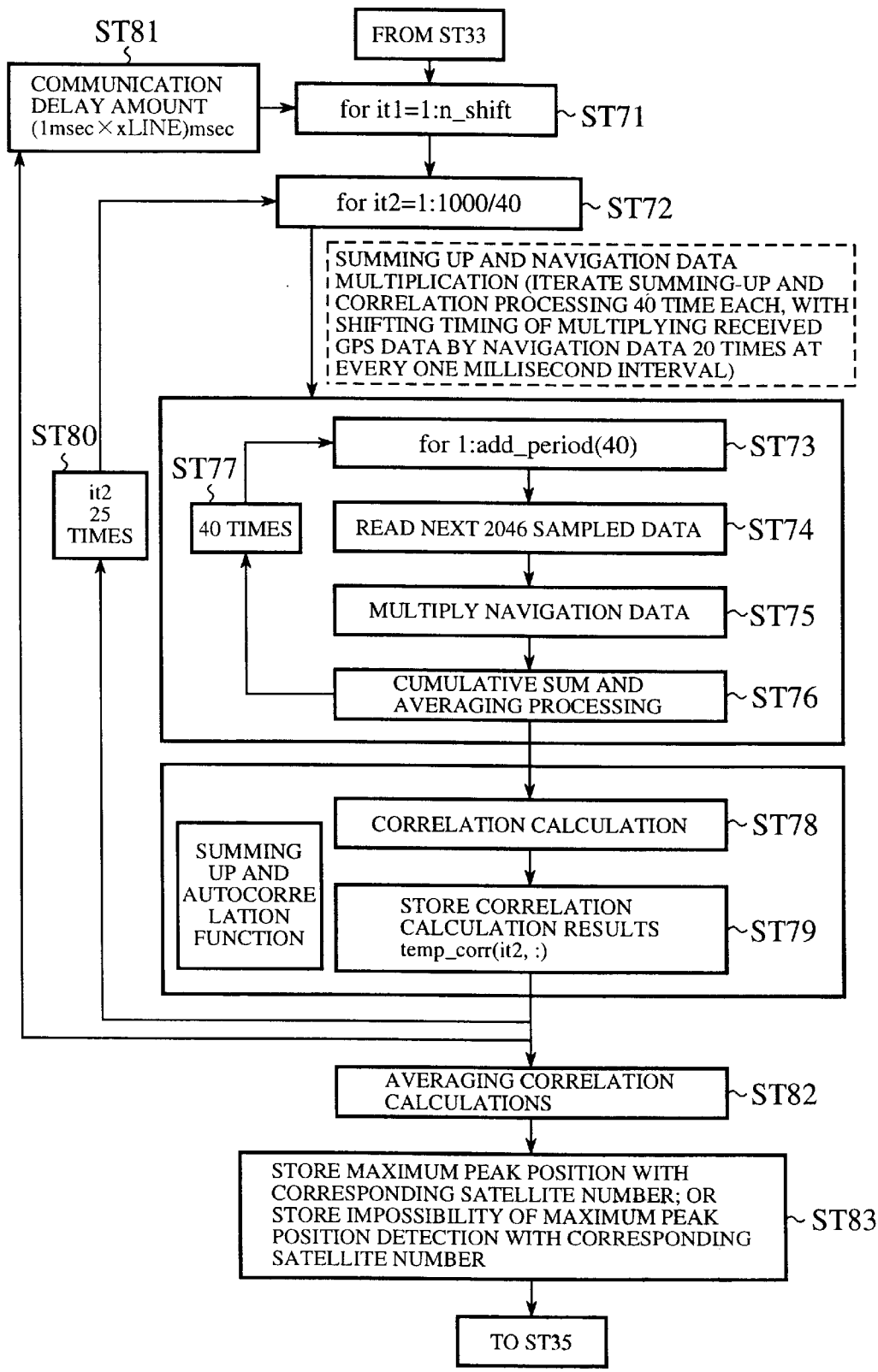
FIG. 17 is a flowchart illustrating another correlation calculation process for detecting polarity inversions in navigation data.

FIG. 17 is a flowchart illustrating another example of the correlation calculation, which is carried out as follows: The GPS signal is A/D converted using a sampling signal consisting of a prescribed number (2046) of pulses per unit time (one millisecond); 1000 rows which correspond to one second, and each of which consists of the prescribed number of data, are stored in the memory; the frequency of the carrier of the selected satellite included in the stored GPS signal of each selected satellite is subjected to the Doppler correction using the Doppler information, which is provided internally by the GPS terminal itself or externally by the external apparatus, and the local oscillation frequency deviation detection information; the C/A code sequence of the selected satellite undergoes the Doppler correction; 40 rows of the Doppler corrected GPS signal read from the memory are subjected to the polarity alignment processing by multiplying the values at corresponding bit positions by the navigation data which is provided internally by the GPS terminal itself or externally by the external apparatus, followed by taking cumulative sums of the 40 rows of data in the prescribed interval and by performing averaging processing of them; correlation calculation is carried out between the averaging processing results and the C/A code sequence; and the results are stored in the memory (steps ST71–79).

Subsequently, a communication delay is determined in terms of milliseconds (one millisecond×rows) by finding using the binary scanning method the scanning start position of the Doppler correction of the navigation data which is set on the basis of the sum of the Doppler correction data fed from the frequency drift detector 19 and the Doppler information which is provided internally by the GPS terminal itself or externally by the external apparatus (step ST81). Thus, the number of times n of the scanning start is determined for the Doppler correction of the navigation data based on the binary scanning method for the 1000 rows of the GPS signal (step ST72). After iterating the processing of steps ST72–ST79 by the number of times n of the scanning, and computes the average of the correlation calculation results (step ST82).

When the peak of the correlation calculation is obtained, the peak position is stored with the number of the corresponding satellite. In this case, the correlation calculation can be terminated when a peak, however small it may be, is obtained. Alternatively, it can be continued by scanning the navigation data until a maximum peak is obtained. When the peak of the correlation calculation cannot be obtained, the navigation data is scanned over a length of an integer multiple of the C/A code length to obtain the peak position of the correlation value. The fact that the maximum peak position cannot be obtained is stored with the number of the corresponding satellite (step ST83).

Figure 18:
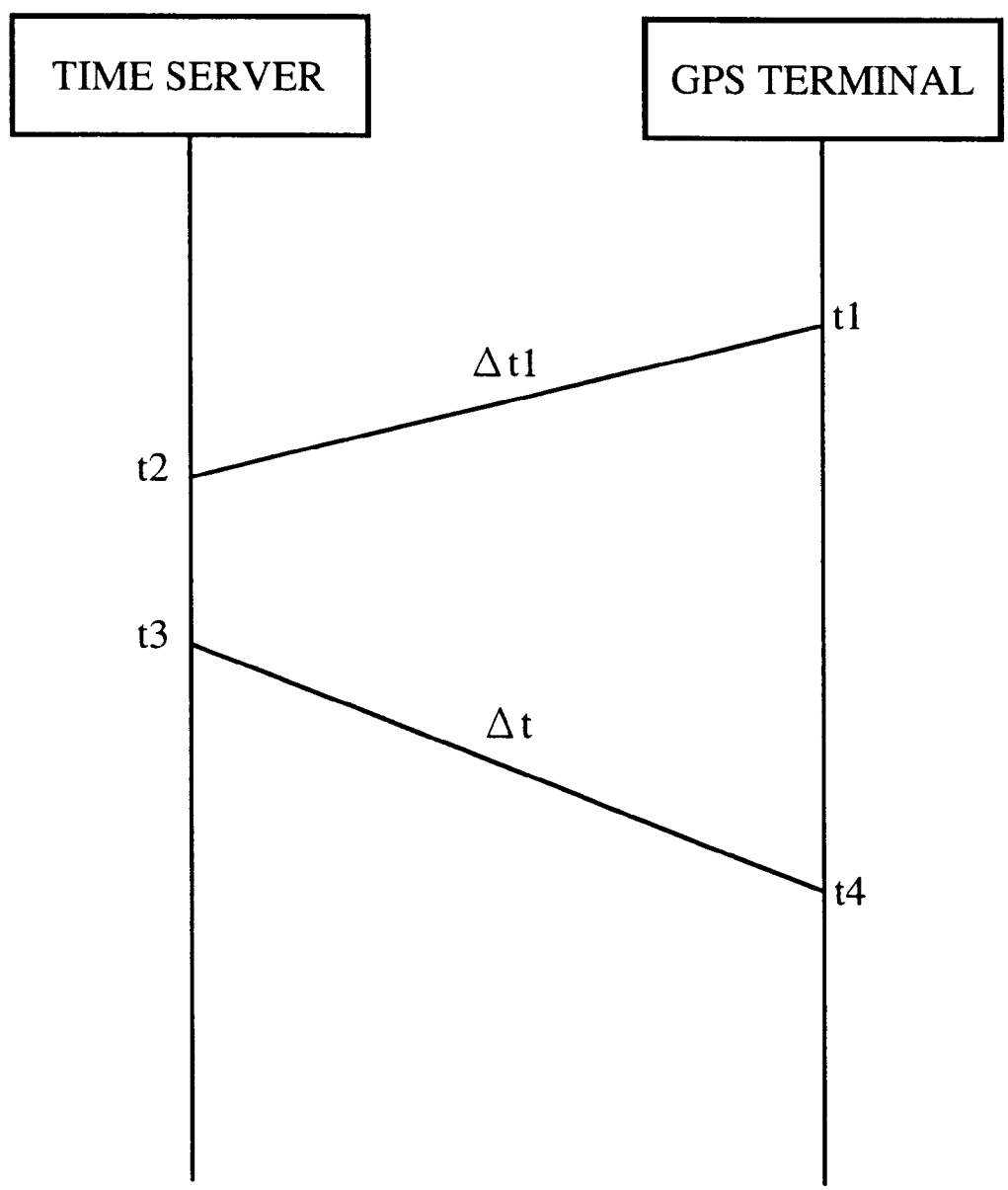
FIG. 18 is a diagram illustrating time adjustment.

The delay time cannot be obtained correctly when there is a time difference between the external apparatus and the GPS terminal. To avoid this, the time of the GPS terminal is adjusted to the time of the external apparatus having a highly accurate atomic clock. The time adjustment will now be described with reference to FIG. 18.

Assume that the signal generating time t1 of the GPS terminal is 2.5, the receiving time t2 of the external apparatus is 3, the signal generating time t3 of the external apparatus that processes the received signal is 4, and the receiving time t4 of the GPS terminal is 5.5. Then the time RTT required for the signal to travel between the GPS terminal and the external apparatus is obtained as follows:

$$RTT = \{(5+0.5)-4\} + \{3-(2+0.5)\} = 2$$

The time error X of the GPS terminal can be determined as follows:

$$\begin{aligned} X &= \{(5+0.5)-4\} - RTT/2 \\ &= \{(5+0.5)-4\} - [\{(5+0.5)-4\} + \{3-(2+0.5)\}]/2 \\ &= 0.5 \end{aligned}$$

Accordingly, the signal processing time of the GPS terminal can be set to that of the external apparatus by shifting the time of the GPS terminal by an amount of the time deviation.

Incidentally, when the external apparatus does not have an accurate atomic clock, but a time server has it, the time adjustment between the GPS terminal and the external apparatus can be performed using the time server in the same manner as described above. The time adjustment is achieved only when the transmission time $\Delta t1$ from the client to the time server equals the transmission time $\Delta t$ from the time server to the client.

Figure 19:
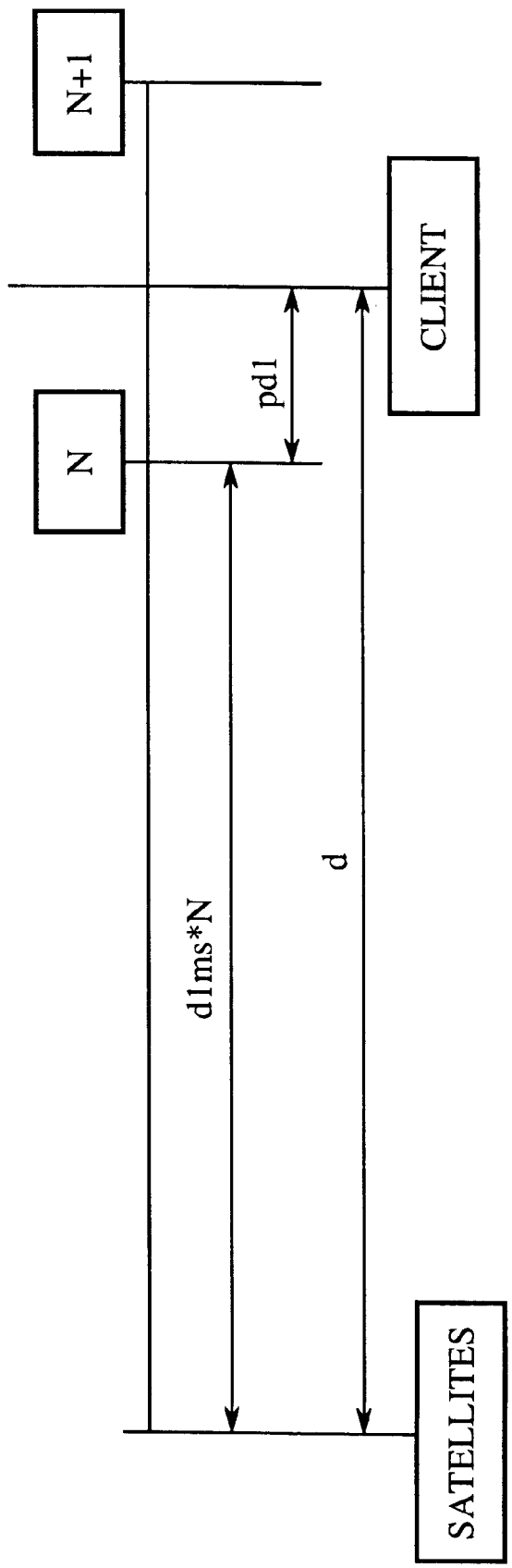
FIG. 19 is a diagram illustrating a pseudo range, delay time or the like between a selected satellite and a GPS terminal.
Figure 20:
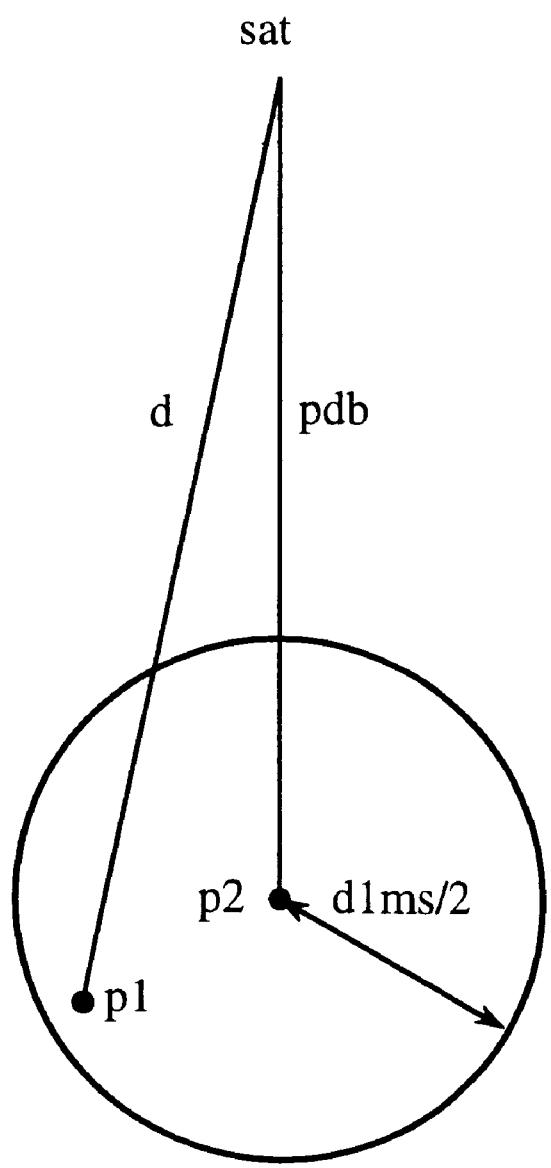
FIG. 20 is a diagram illustrating the above relationships three-dimensionally.
Figure 21:
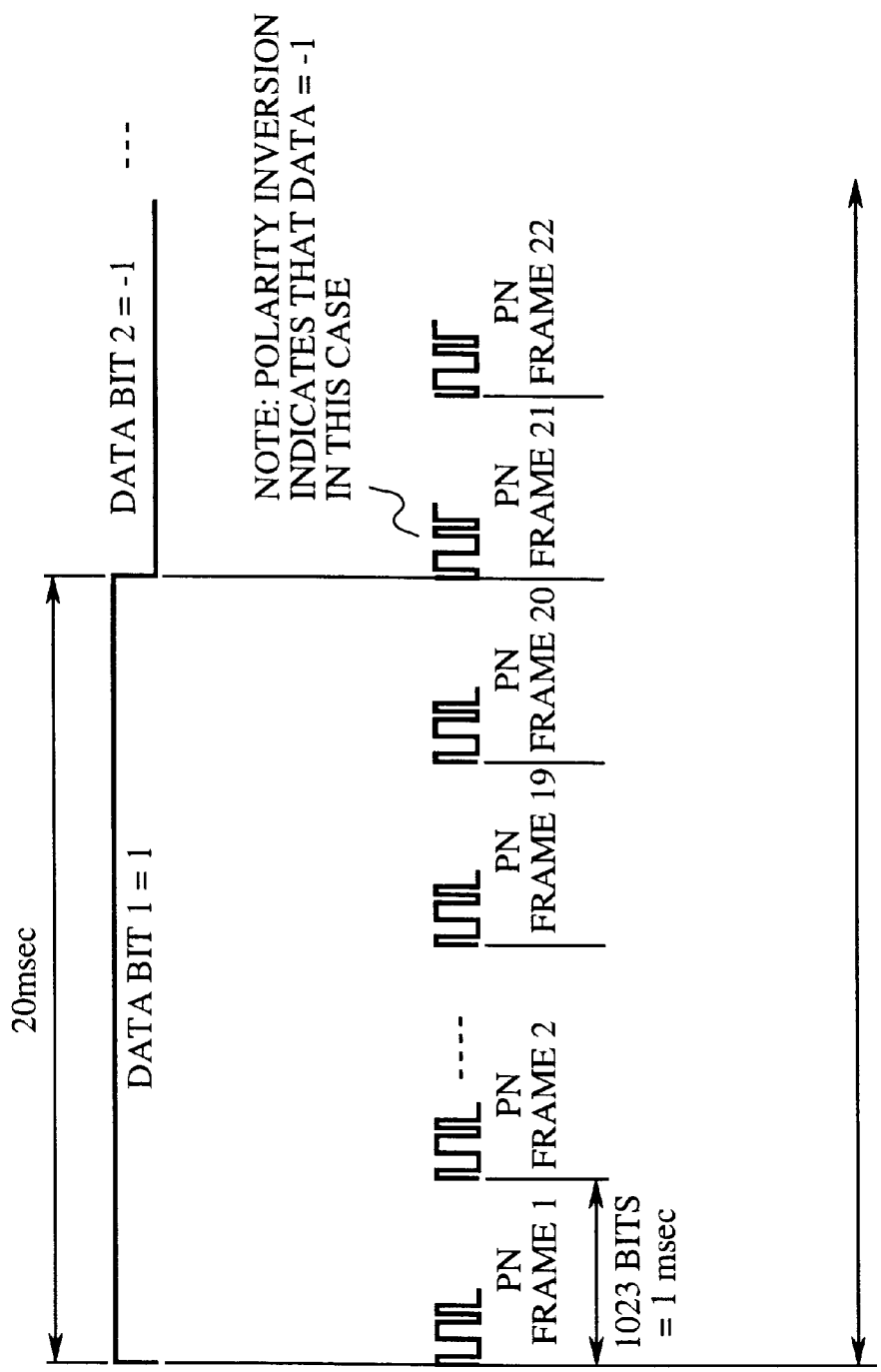
FIG. 21 is a diagram illustrating a C/A code sequence.
Figure 22:
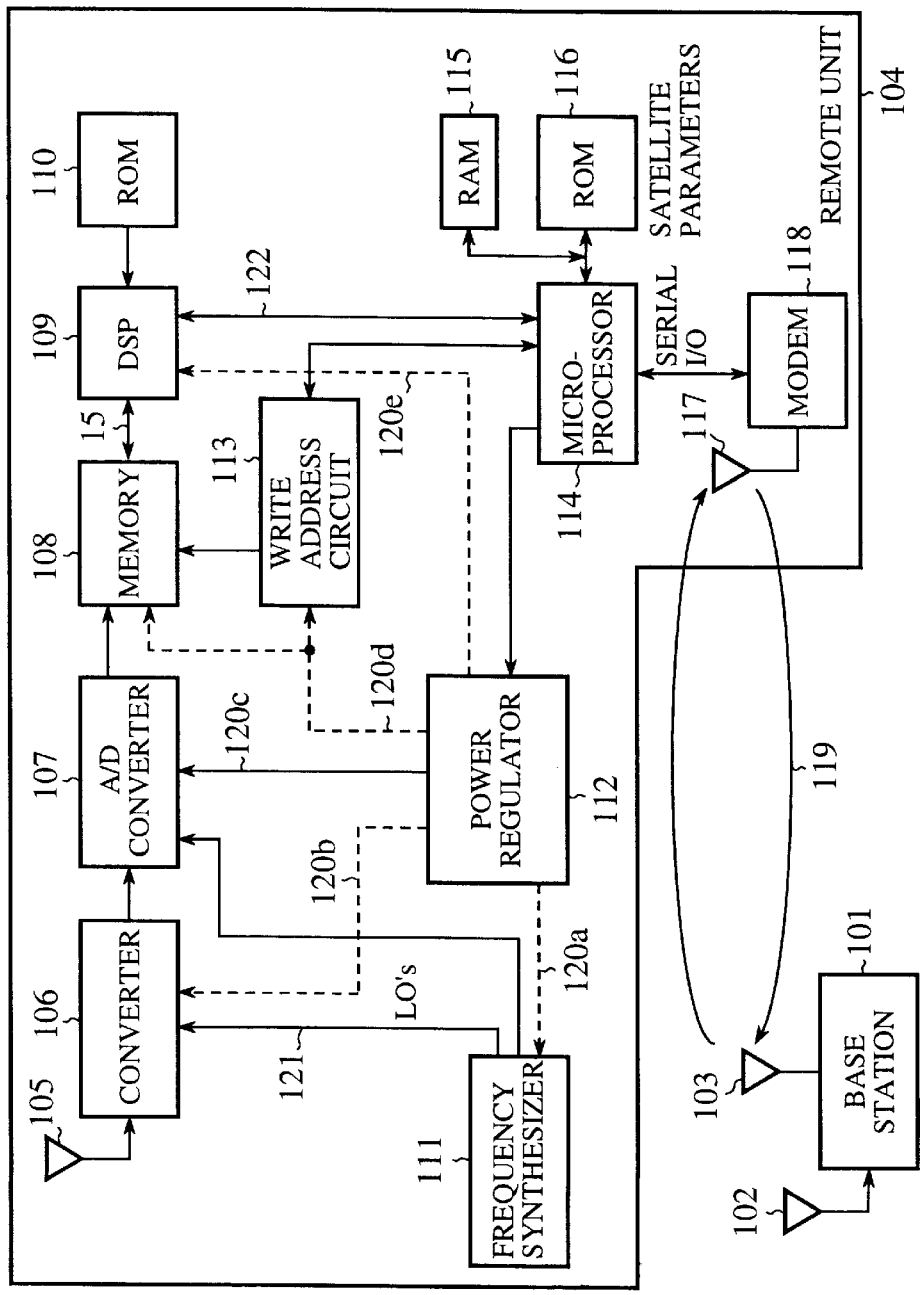
FIG. 22 is a block diagram showing a configuration of a conventional Global Positioning System and Global Positioning apparatus.
Figure 23:
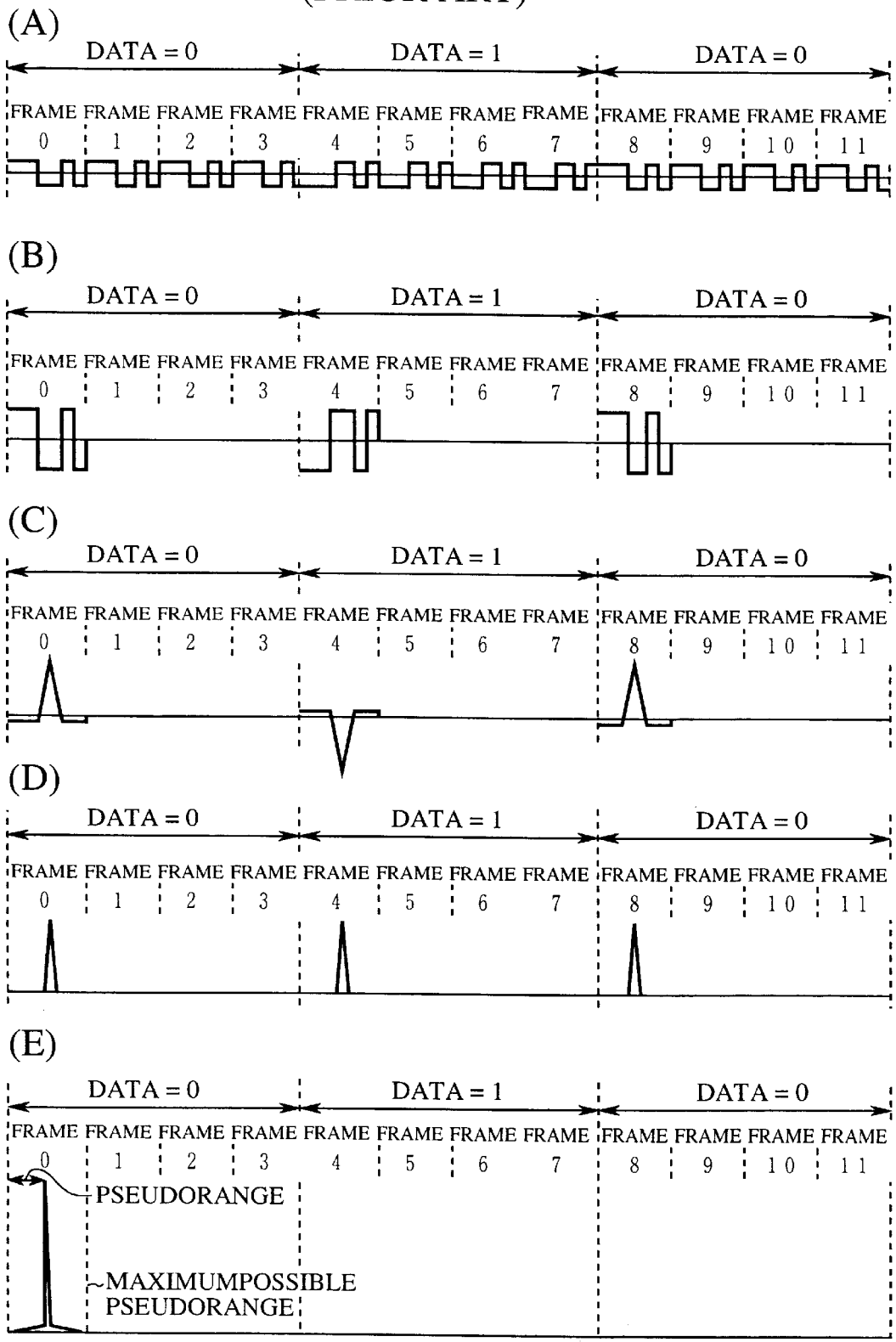
FIG. 23 is a diagram illustrating a method of detecting a C/A code sequence in the conventional Global Positioning System and Global Positioning apparatus.

FIGS. 19 and 20 are diagrams illustrating a method for obtaining the pseudo range, in which C is the speed of light per millisecond, N is an integer multiple of the C/A code from the selected satellite to the GPS terminal, pd1 is a delay time, p1 is a position of the GPS terminal, and p2 is the position of the external apparatus. Then, C=299792.458 m (about 300 km)/millisecond d=C×N+pd1 dmax=pdb+C/2 (about 150 km)

dmin=pdb−C/2 (about 150 km)

pdb−C/2<d<pdb+C/2

∴(pdb−pd1)/C−0.5<N<(pdb−pd1)/C+0.5

∴N=round (nf)

nf=(pdb−pd1)/C

Therefore, the pseudo range d can be determined by obtaining N from the foregoing equations, and by substituting it to the above equation d=C×N+pd1.

As described above, the present embodiment 1 divides into the data blocks the regularly arranged C/A code sequence including a series of PN frames consisting of multiple chips at every navigation data interval beginning from any desired position; cumulatively sums up the values at the same positions in the divided C/A codes; further sums up the cumulative sums with matching their polarities in accordance with the internally detected navigation data or externally supplied navigation data from the central server; carries out the correlation calculation between the resultant sums and the reference C/A code sequence; and makes the correlation peak position as the start position of the data summation. This enables the C/A code sequence to be cumulatively summed up efficiently without the adverse effect due to the polarity inversions in the navigation data, and makes it possible to positively receive the C/A code sequence in such a bad environment as in a tunnel or building in which the receiving sensitivity is poor.

For example, a mobile phone, on which the above described Global Positioning System and Global Positioning apparatus is. mounted, and which displays on its map the position detected by the Global Positioning System and Global Positioning apparatus on the basis of the data read from the memory, can implement a highly accurate navigation function that is effective even in a poor receiving sensitivity environment such as in a tunnel or building.

ADVANTAGES OF THE PRESENT INVENTION

As described above, according to one aspect of the present invention, it is configured such that the GPS terminal converts a frequency of the GPS signal received; A/D converts the GPS signal passing through the frequency conversion using a sampling signal consisting of a predetermined number of pulses per unit time; stores the GPS signal after the A/D conversion for a predetermined time interval; performs Doppler correction of a carrier frequency of a selected satellite included in the stored GPS signal using local oscillation frequency deviation detection information and Doppler information which is detected by the GPS terminal or provided by the external apparatus; performs Doppler correction of a C/A code signal of the selected satellite; performs over a prescribed interval a processing in which corresponding bit values in individual C/A code long blocks of the GPS signal passing through the Doppler correction are multiplied by the navigation data which is provided by the external apparatus or detected by the GPS terminal itself to align polarity of the corresponding bit values, followed by summing up the corresponding bit values over the prescribed interval; iterates the same processing by a number of the navigation data, followed by obtaining cumulative results of the processings; carries out correlation calculation between the cumulative results and the C/A code signal of the selected satellite held in the GPS terminal; obtains a delay time to a peak position of the correlation values; and determines a pseudo range between the GPS terminal and the selected satellite from the delay time, and that it detects the received electric field intensity, and receives the data from the external apparatus only when the received electric field intensity is weak. This offers an advantage of being able to markedly reduce the communication cost as compared with the conventional system which continuously communicates with the external apparatus.

According to another aspect of the present invention, it is configured such that it successively divides the regularly arranged C/A code sequence consisting of PN frames including a lot of bits into a length of the navigation data beginning from any desired position; takes cumulative sums of the corresponding bit positions of the divided C/A codes; sums up the resultant cumulative sums with matching their polarities in accordance with the navigation data detected in the GPS terminal itself or with the navigation data sent from the central server; carries out the correlation calculation between the summed up results and the C/A code sequence to obtain the correlation peak position, and adopts the correlation peak position as the start position of the data summation. This makes it possible to positively detect the C/A code sequence buried in noise, and to improve the S/N ratio.

Thus, when applied to mobile phones or the like, it offers an advantage of enabling them to positively receive the C/A code sequence even in an environment with a poor receiving sensitivity such as in a building or on a platform of a subway. Besides, since the sum-up interval is made variable in response to the conditions of the received electric field intensity, the C/A code sequence can be more surely received.

According to a still another aspect of the present invention, it is configured such that the GPS terminal converts a frequency of the GPS signal received; A/D converts the GPS signal passing through the frequency conversion using a sampling signal consisting of a predetermined number of pulses per unit time; stores the GPS signal after the A/D conversion for a predetermined time interval; performs Doppler correction of a carrier frequency of a selected satellite included in the stored GPS signal using local oscillation frequency deviation detection information and Doppler information one of the GPS terminal and the external apparatus provides; performs Doppler correction of a C/A code signal of the selected satellite; performs over a prescribed interval a processing in which corresponding bit values in individual C/A code long blocks of the GPS signal passing through the Doppler correction are multiplied by the navigation data one of the external apparatus and the GPS terminal provides to align polarity of the corresponding bit values, followed by summing up the corresponding bit values over the prescribed interval, and by an averaging processing of the sums; carries out correlation calculation between the averaging results and the C/A code held in the GPS terminal; iterates similar correlation calculations sequentially for the GPS signal stored in the memory over the prescribed interval; scans, when a peak of the correlation calculation values is not obtained, the navigation data by a length of an integer multiple of the C/A code length; obtains a delay time to a peak position of the correlation values; and determines a pseudo range between the GPS terminal and the selected satellite from the delay time. This makes it possible to obtain the delay time at high accuracy as the foregoing, and hence to implement the highly sensitive Global Positioning System and Global Positioning apparatus.

According to another aspect of the present invention, it is configured such that the correlation calculation can be terminated when even a very small peak of the correlation calculation values is obtained. This makes it possible to complete the correlation calculation quickly.

According to another aspect of the present invention, it is configured such that the correlation calculation can be performed with scanning the navigation data until a maximum peak of the correlation calculation values is obtained. This makes it possible to positively carry out the measurement.

According to another aspect of the present invention, it is configured such that the GPS terminal can comprise a GPS radio frequency stage; a frequency converter; a local oscillator; an oscillation frequency deviation detector; an A/D converter; and a digital signal processor that includes a memory for storing C/A codes of all satellites and a computing section. This makes it possible to simplify the entire configuration.

According to another aspect of the present invention, it is configured such that the oscillation frequency deviation detector can comprise a memory for storing data used for estimating frequency drifts for temperatures, and use, as Doppler correction data, data read from the memory in response to a temperature detected by a temperature sensor for detecting temperature of the local oscillator. This makes it possible to implement a highly sensitive Global Positioning System and Global Positioning apparatus with eliminating the effect of temperature.

According to another aspect of the present invention, it is configured such that the GPS terminal can set a scanning start position of Doppler correction of the navigation data in accordance with a sum of the Doppler correction data read from the memory in response to the temperature detected by the temperature sensor for detecting the temperature of the local oscillator and the Doppler information one of the external apparatus and GPS terminal provides. This make is possible to carry out the Doppler correction quickly.

According to another aspect of the present invention, it is configured such that the oscillation frequency deviation detector can receive from an external apparatus a reference signal with higher accuracy than that generated by a reference oscillator installed in the GPS terminal, detect the local oscillation frequency deviation by counting the oscillation frequency over an interval of the reference signal with the higher accuracy; and use detected data as the Doppler correction data. This makes it possible to carry out the Doppler correction at high accuracy.

According to another aspect of the present invention, it is configured such that the GPS terminal can detect the local oscillation frequency deviation by counting the oscillation frequency over an interval of a reference signal sent from an external apparatus; and set the scanning start position of the Doppler correction of the navigation data in response to a sum of Doppler correction data corresponding to the detected local oscillation frequency deviation and the Doppler information one of the external apparatus and GPS terminal itself provides. This makes it possible to carry out the Doppler correction quickly.

According to another aspect of the present invention, it is configured such that the local oscillator can comprise a reference oscillator, and stabilize an oscillation frequency of the reference oscillator in synchronism with a frequency supplied from an external apparatus with higher accuracy than the oscillation frequency of the reference oscillator. This makes it possible to implement the highly accurate oscillation frequency.

According to another aspect of the present invention, it is configured such that the GPS terminal can iterate, when the peak position of the correlation calculation values is not obtained, the scanning of the navigation data until the peak position of the correlation calculation values is obtained with varying at least one of Doppler correction data from an oscillation frequency deviation detector and the Doppler information which is provided by the external apparatus or detected by the GPS terminal. This makes it possible to carry out measurement quickly.

According to another aspect of the present invention, it is configured such that scanning of the navigation data can utilize a binary scanning method. This makes it possible to carry out the scanning of the navigation data with accuracy.

According to another aspect of the present invention, it is configured such that the GPS terminal can generate I signal data and Q signal data with their carrier components removed by multiplying the GPS signal read from the memory by GPS carrier sine data and GPS carrier cosine data which are orthogonal to each other and pass through the frequency conversion; multiply the I signal data and Q signal data by sine data and cosine data of a frequency shift obtained by summing Doppler correction data fed from an oscillator frequency deviation detector and the Doppler data which is provided by the external apparatus or detected by the GPS terminal itself; extract from resultant signals C/A code signals which are Doppler corrected and orthogonal to each other; and carry out correlation calculation of I and Q signals of the C/A code signals, followed by vector composition. This makes it possible to carry out the Doppler correction of the GPS carrier after the frequency conversion.

According to another aspect of the present invention, it is configured such that the prescribed number of the sampling signal for the A/D conversion can be increased which is carried out after the frequency conversion of the received GPS signal. This makes it possible to improve the measurement accuracy.

According to another aspect of the present invention, it is configured such that the GPS terminal can transmit its time signal to a time server that generates an exact time signal, and receive the time signal from the time server to know a traveling time of a signal from the GPS terminal to the server. This makes it possible to adjust the time of the GPS terminal to the correct time of the time server.

According to another aspect of the present invention, it is configured such that the external apparatus can comprise a time server generating an exact time signal, wherein the GPS terminal can transmit its time signal to the time server that generates the exact time signal, receive the time signal from the time server to know a traveling time of a signal from the GPS terminal to the server, and set a scanning start position for multiplying the GPS signal by the navigation data in response to the traveling time. This makes it possible to carry out the Doppler correction quickly.

According to another aspect of the present invention, it is configured such that the scanning of the navigation data can utilize a binary scanning method. This makes it possible to carry out scanning of the navigation data with accuracy.

According to another aspect of the present invention, it is configured such that the correlation calculation interval can be made variable in response to an electric field intensity detected by a received electric field intensity detector for detecting a condition of the received electric field. This makes it possible to make quick and accurate decision as to whether the received electric field is good or poor.

According to another aspect of the present invention, it is configured such that the summing up interval can be made variable in response to a condition of a received electric field. This makes it possible to make quick and accurate decision as to whether the received electric field is good or poor.

According to another aspect of the present invention, it is configured such that the GPS terminal can comprise: storing means for storing for a predetermined time interval the received GPS signal that passes through a frequency conversion and an A/D conversion using a sampling signal consisting of a predetermined number of pulses per unit time; dividing means for dividing the GPS signal stored in the storing means by navigation data which is detected by the GPS terminal itself or provided by the external apparatus; sum-up means for performing over a prescribed interval a processing in which the divided GPS signal are multiplied by the navigation data to align polarity, followed by summing up over the prescribed interval; iterating means for iterating similar processing by a number of the navigation data to obtain cumulative results; correlation calculation means for carrying out correlation calculation between the cumulative sums and the C/A code sequence of a selected satellite held in the GPS terminal, and for obtaining a delay time to a peak position of the correlation values; and pseudo range detecting means for determining a pseudo range between the GPS terminal and the selected satellite from the delay time to the peak position. This makes it possible to implement a highly accurate Global Positioning system.

As another embodiment, the correlation calculation can utilize FFT and IFFT to achieve high speed operation.

As still another embodiment, it is possible to use instead of the correlation calculation, the number of agreements between the C/A codes generated by the GPS terminal itself and the received C/A codes, or the degree of agreement between them.

The present invention is not limited to the above described embodiments and variations, and modifications may be made without departing from the scope of the present invention.

What is claimed is:

1. A Global Positioning System including an external apparatus that receives a GPS signal from a satellite and extracts navigation data and Doppler information from the GPS signal, and a GPS terminal that is connected to the external apparatus through a communication medium and receives the GPS signal from the satellite, said GPS terminal converting a frequency of the GPS signal received; A/D converting the GPS signal passing through the frequency conversion using a sampling signal consisting of a predetermined number of pulses per unit time; storing the GPS signal after the A/D conversion for a predetermined time interval; performing Doppler correction of a carrier frequency of a selected satellite included in the stored GPS signal using local oscillation frequency deviation detection information and Doppler information which is detected by said GPS terminal or provided by said external apparatus; performing Doppler correction of a C/A code signal of said selected satellite; performing over a prescribed interval a processing in which corresponding bit values in individual C/A code long blocks of the GPS signal passing through the Doppler correction are multiplied by the navigation data which is provided by the external apparatus or detected by the GPS terminal itself to align polarity of the corresponding bit values, followed by summing up the corresponding bit values over the prescribed interval; iterating the same processing by a number of the navigation data, followed by obtaining cumulative results of the processings; carrying out correlation calculation between the cumulative results and the C/A code signal of the selected satellite held in said GPS terminal; obtaining a delay time to a peak position of the correlation values; and determining a pseudo range between said GPS terminal and the selected satellite from the delay time.

2. A Global Positioning System including an external apparatus that receives a GPS signal from a satellite and extracts navigation data and Doppler information from the GPS signal, and a GPS terminal that is connected to the external apparatus through a communication medium and receives the GPS signal from the satellite, said GPS terminal converting a frequency of the GPS signal received; A/D converting the GPS signal passing through the frequency conversion using a sampling signal consisting of a predetermined number of pulses per unit time; storing the GPS signal after the A/D conversion for a predetermined time interval; performing Doppler correction of a carrier frequency of a selected satellite included in the stored GPS signal using local oscillation frequency deviation detection information and Doppler information one of said GPS terminal and said external apparatus provides; performing Doppler correction of a C/A code signal of said selected satellite; performing over a prescribed interval a processing in which corresponding bit values in individual C/A code long blocks of the GPS signal passing through the Doppler correction are multiplied by the navigation data one of the external apparatus and the GPS terminal provides to align polarity of the corresponding bit values, followed by summing up the corresponding bit values over the prescribed interval, and by an averaging processing of the sums; carrying out correlation calculation between the averaging results and the C/A code held in said GPS terminal; iterating similar correlation calculations sequentially for the GPS signal stored in said memory over the prescribed interval; scanning, when a peak of the correlation calculation values is not obtained, the navigation data by a length of an integer multiple of the C/A code length; obtaining a delay time to a peak position of the correlation values; and determining a pseudo range between said GPS terminal and the selected satellite from the delay time.

3. The Global Positioning System according to claim 1, wherein the correlation calculation is terminated when even a very small peak of the correlation calculation values is obtained.

4. The Global Positioning System according to claim 2, wherein the correlation calculation is terminated when even a very small peak of the correlation calculation values is obtained.

5. The Global Positioning System according to claim 1, wherein the correlation calculation is performed with scanning the navigation data until a maximum peak of the correlation calculation values is obtained.

6. The Global Positioning System according to claim 2, wherein the correlation calculation is performed with scanning the navigation data until a maximum peak of the correlation calculation values is obtained.

7. The Global Positioning System according to claim 1, wherein said GPS terminal comprises a GPS radio frequency stage; a frequency converter; a local oscillator; an oscillation frequency deviation detector; an A/D converter; and a digital signal processor that includes a memory for storing C/A codes of all satellites and a computing section.

8. The Global Positioning System according to claim 2, wherein said GPS terminal comprises a GPS radio frequency stage; a frequency converter; a local oscillator; an oscillation frequency deviation detector; an A/D converter; and a digital signal processor that includes a memory for storing C/A codes of all satellites and a computing section.

9. The Global Positioning System according to claim 7, wherein said oscillation frequency deviation detector comprises a memory for storing data used for estimating frequency drifts for temperatures, and uses, as Doppler correction data, data read from said memory in response to a temperature detected by a temperature sensor for detecting temperature of said local oscillator.

10. The Global Positioning System according to claim 9, wherein said GPS terminal sets a scanning start position of Doppler correction of the navigation data in accordance with a sum of the Doppler correction data read from said memory in response to the temperature detected by said temperature sensor for detecting the temperature of said local oscillator and the Doppler information one of said external apparatus and GPS terminal provides.

11. The Global Positioning System according to claim 7, wherein said GPS terminal receives from an external apparatus a reference signal with higher accuracy than that generated by a reference oscillator installed in said GPS terminal, detects the local oscillation frequency deviation by counting the oscillation frequency over an interval of the reference signal with the higher accuracy; and uses detected data as the Doppler correction data.

12. The Global Positioning System according to claim 10, wherein said GPS terminal detects the local oscillation frequency deviation by counting the oscillation frequency over an interval of a reference signal sent from an external apparatus; and sets the scanning start position of the Doppler correction of the navigation data in response to a sum of Doppler correction data corresponding to the detected local oscillation frequency deviation and the Doppler information one of said external apparatus and GPS terminal itself provides.

13. The Global Positioning System according to claim 1, wherein said local oscillator comprises a reference oscillator, and stabilizes an oscillation frequency of said reference oscillator in synchronism with a frequency supplied from an external apparatus with higher accuracy than the oscillation frequency of said reference oscillator.

14. The Global Positioning System according to claim 1, wherein said GPS terminal iterates, when the peak position of the correlation calculation values is not obtained, the scanning of the navigation data until the peak position of the correlation calculation values is obtained with varying at least one of Doppler correction data from an oscillation frequency deviation detector and the Doppler information which is provided by said external apparatus or detected by said GPS terminal.

15. The Global Positioning System according to claim 13, wherein scanning of the navigation data utilizes a binary scanning method.

16. The Global Positioning System according to claim 1, wherein said GPS terminal generates I signal data and Q signal data with their carrier components removed by multiplying the GPS signal read from said memory by GPS carrier sine data and GPS carrier cosine data which are orthogonal to each other and pass through the frequency conversion; multiplies the I signal data and Q signal data by sine data and cosine data of a frequency shift obtained by summing Doppler correction data fed from an oscillator frequency deviation detector and the Doppler data which is provided by said external apparatus or detected by said GPS terminal itself; extracts from resultant signals C/A code signals which are Doppler corrected and orthogonal to each other; and carries out correlation calculation of I and Q signals of the C/A code signals, followed by vector composition.

17. The Global Positioning System according to claim 2, wherein said GPS terminal generates I signal data and Q signal data with their carrier components removed by multiplying the GPS signal read from said memory by GPS carrier sine data and GPS carrier cosine data which are orthogonal to each other and pass through the frequency conversion; multiplies the I signal data and Q signal data by sine data and cosine data of a frequency shift obtained by summing Doppler correction data fed from an oscillator frequency deviation detector and the Doppler data which is provided by said external apparatus or detected by said GPS terminal itself; extracts from resultant signals C/A code signals which are Doppler corrected and orthogonal to each other; and carries out correlation calculation of I and Q signals of the C/A code signals, followed by vector composition.

18. The Global Positioning System according to claim 1, wherein the prescribed number can be increased of the sampling signal for the A/D conversion which is carried out after the frequency conversion of the received GPS signal.

19. The Global Positioning System according to claim 1, wherein said GPS terminal transmits its time signal to a time server that generates an exact time signal, and receives the time signal from the time server to know a traveling time of a signal from said GPS terminal to said server.

20. The Global Positioning System according to claim 1, wherein said external apparatus comprises a time server generating an exact time signal, and wherein said GPS terminal transmits its time signal to said time server that generates the exact time signal, receives the time signal from the time server to know a traveling time of a signal from said GPS terminal to said server, and sets a scanning start position for multiplying the GPS signal by the navigation data in response to the traveling time.

21. The Global Positioning System according to claim 20, wherein the scanning of the navigation data utilizes a binary scanning method.

22. The Global Positioning System according to claim 1, wherein the correlation calculation interval is made variable in response to an electric field intensity detected by a received electric field intensity detector for detecting a condition of the received electric field.

23. The Global Positioning System according to claim 1, wherein the summing up interval is made variable in response to a condition of a received electric field.

24. A Global Positioning apparatus including an external apparatus that receives a GPS signal from a satellite and extracts navigation data and Doppler information from the GPS signal, and a GPS terminal that is connected to the external apparatus through a communication medium and receives the GPS signal from the satellite, said GPS terminal comprising:

storing means for storing for a predetermined time interval the received GPS signal that passes through a frequency conversion and an A/D conversion using a sampling signal consisting of a predetermined number of pulses per unit time;

dividing means for dividing the GPS signal stored in said storing means by navigation data which is detected by said GPS terminal itself or provided by said external apparatus;

sum-up means for performing over a prescribed interval a processing in which the divided GPS signal are multiplied by the navigation data to align polarity, followed by summing up over the prescribed interval;

iterating means for iterating similar processing by a number of the navigation data to obtain cumulative results;

correlation calculation means for carrying out correlation calculation between the cumulative sums and the C/A code sequence of a selected satellite held in said GPS terminal, and for obtaining a delay time to a peak position of the correlation values; and pseudo range detecting means for determining a pseudo range between said GPS terminal and the selected satellite from the delay time to the peak position.

* * * * *

UNITED STATES PATENT AND TRADEMARK OFFICE
CERTIFICATE OF CORRECTION

PATENT NO.   : 6,329,946 B1
DATED        : December 11, 2001
INVENTOR(S)  : Seiichiro Hirata and Sergy V. Lyusin Page 1 of 2

It is certified that error appears in the above-identified patent and that said Letters Patent is hereby corrected as shown below:

Drawings,
Sheet 14, Fig. 14, the label "40xM ROWS" should read -- 20XM ROWS --.
Sheet 15, Fig. 15, in the second line of text in the step with the label "ST34" change "SUM UP 40 PN FRAMES" to -- SUM UP 20 PN FRAMES --.

Column 13,
Line 11, the text/formula "2046x40 xM chips" should read as follows:
-- 2046x20xM chips --;
Line 15, the text/formula "2046x40xM" should read -- 2046x20xM --, and the text "40xM" should read -- 20xM --;
Line 22, the text "Mx40" should read -- Mx20 --;
Line 33, the text/formula "40x2023" should read -- 20x2046 --.
Lines 39-46, replace the formula therein with the following formula:

--
$$S_1(D_1) = d(1,1,1) + d(1,2,1) + d(1,3,1) + \ldots + d(1,20,1)$$
$$S_2(D_1) = d(2,1,1) + d(2,2,1) + d(2,3,1) + \ldots + d(2,20,1)$$
$$S_3(D_1) = d(3,1,1) + d(3,2,1) + d(3,3,1) + \ldots + d(3,20,1)$$
$$S_i(D_1) = d(i,1,1) + d(i,2,1) + d(i,3,1) + \ldots + d(i,20,1)$$
$$S_{2046}(D_1) = d(2046,1,1) + d(2046,2,1) + \ldots + d(2046,20,1)$$
--

Lines 55-63, replace the formula therein with the following formula:
--
$$S_1(D_2) = d(1,1,2) + d(1,2,2) + d(1,3,2) + \ldots + d(1,20,2)$$
$$S_2(D_2) = d(2,1,2) + d(2,2,2) + d(2,3,2) + \ldots + d(2,20,2)$$
$$S_3(D_2) = d(3,1,2) + d(3,2,2) + d(3,3,2) + \ldots + d(3,20,2)$$
$$S_i(D_2) = d(i,1,2) + d(i,2,2) + d(i,3,2) + \ldots + d(i,20,2)$$
$$S_{2046}(D_2) = d(2046,1,2) + d(2046,2,2) + \ldots + d(2046,20,2)$$
--

UNITED STATES PATENT AND TRADEMARK OFFICE
CERTIFICATE OF CORRECTION

PATENT NO.    : 6,329,946 B1
DATED         : December 11, 2001
INVENTOR(S)   : Seiichiro Hirata and Sergy V. Lyusin It is certified that error appears in the above-identified patent and that said Letters Patent is hereby corrected as shown below:

Column 14,
Lines 6-13, replace the formula therein with the following formula:

$$S_1(D_M) = d(1,1,M) + d(1,2,M) + d(1,3,M) + \ldots + d(1,20,M)$$
$$S_2(D_M) = d(2,1,M) + d(2,2,M) + d(2,3,M) + \ldots + d(2,20,M)$$
$$S_3(D_m) = d(3,1,M) + d(3,2,M) + d(3,3,M) + \ldots + d(3,20,M)$$
$$S_i(D_M) = d(i,1,M) + d(i,2,M) + d(i,3,M) + \ldots + d(i,20,M)$$
$$S_{2046}(D_M) = d(2046,1,M) + d(2046,2,M) + \ldots + d(2046,20,M)$$

Signed and Sealed this

First Day of July, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,329,946 B1
DATED         : December 11, 2001
INVENTOR(S)   : Hirata et al.

It is certified that error appears in the above-identified patent and that said Letters Patent is hereby corrected as shown below:

Column 12,
Line 16, "successively" should be deleted;

Column 14,
Line 52, "Δ An chip" should be replaced with -- Δ n chip --;

Column 16,
Line 38, "obtaining" should be replaced with -- measuring --;
Line 39, before "per" please add -- measured --; and
Line 55, "∴" should be replaced with -- , where --.

Signed and Sealed this

Third Day of August, 2004

JON W. DUDAS
*Acting Director of the United States Patent and Trademark Office*